(12) United States Patent
Nakamura et al.

(10) Patent No.: US 9,048,483 B2
(45) Date of Patent: Jun. 2, 2015

(54) POWER SUPPLY DEVICE, POWER-SUPPLY-DEVICE SEPARATOR, AND POWER SUPPLY-DEVICE-EQUIPPED VEHICLE AND ELECTRIC POWER STORAGE

(75) Inventors: Shinsuke Nakamura, Kobe (JP); Wataru Okada, Kobe (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 368 days.

(21) Appl. No.: 13/549,882

(22) Filed: Jul. 16, 2012

(65) Prior Publication Data

US 2014/0014420 A1    Jan. 16, 2014

(51) Int. Cl.

| | |
|---|---|
| *H05K 7/20* | (2006.01) |
| *H01M 2/10* | (2006.01) |
| *H01M 10/04* | (2006.01) |
| *H01M 10/613* | (2014.01) |
| *H01M 10/625* | (2014.01) |
| *H01M 10/647* | (2014.01) |
| *H01M 10/6557* | (2014.01) |
| *H01M 10/6563* | (2014.01) |
| *B60L 11/18* | (2006.01) |

(52) U.S. Cl.
CPC ........ *H01M 2/1077* (2013.01); *H01M 10/0481* (2013.01); *H01M 10/5004* (2013.01); *H01M 10/5016* (2013.01); *H01M 10/5032* (2013.01); *H01M 10/5059* (2013.01); *H01M 10/5067* (2013.01); *H01M 2220/20* (2013.01); *B60L 11/1879* (2013.01); *Y02T 10/7005* (2013.01); *Y02T 10/705* (2013.01)

(58) Field of Classification Search
None
See application file for complete search history.

(56) References Cited

U.S. PATENT DOCUMENTS

| 2010/0167115 A1* | 7/2010 | Okada et al. ............ 429/99 |
|---|---|---|
| 2010/0285347 A1* | 11/2010 | Saito et al. ............. 429/120 |

FOREIGN PATENT DOCUMENTS

JP    2010-287550    12/2010

\* cited by examiner

*Primary Examiner* — Courtney Smith
(74) *Attorney, Agent, or Firm* — Wenderoth, Lind & Ponack, L.L.P.

(57) ABSTRACT

A power supply device includes battery cells, separators, and fastening members. The plurality of battery cells have a rectangular-box exterior shape. The separators are interposed between the battery cells, which are arranged side by side. The fastening members securely hold a battery assembly of the battery cells and the separators, which are alternately arranged side by side. The surfaces of each of the battery cells is covered by an electrically insulating covering member. Each of the separators has recessed parts that form a plurality of gas-flowing paths between the battery cells so that cooling gas can flow along surfaces of these battery cells when this separator is interposed between these battery cells. Edge parts of the recessed part, which forms the gas-flowing paths, are rounded.

19 Claims, 22 Drawing Sheets

POWER SUPPLY DEVICE, POWER-SUPPLY-DEVICE SEPARATOR, AND POWER SUPPLY-DEVICE-EQUIPPED VEHICLE AND ELECTRIC POWER STORAGE

BACKGROUND OF THE INVENTION

1. Field of the Invention

The present invention mainly relates to a power supply device that can be used as large current power supplies for electric motor for driving cars such as hybrid car and electric vehicle, and as electric power storages for home use and manufacturing plants, and a separator that can be used for this type of power supply device. The present invention also relates to a vehicle and an electric power storage including this power supply device.

2. Description of the Related Art

Power supply devices such as battery packs for vehicles are required which can supply high electric power. In order to accommodate a number of battery cells in limited space, the high power supply devices generally include rectangular batteries, which can efficiently occupy space. The rectangular battery includes electrode members, and a rectangular exterior container that accommodates the electrode members, and a sealing plate that seals the exterior case. A number of rectangular batteries are arranged side by side with electrically insulating members such as resin separators being interposed between the rectangular battery cells. After the battery cells and the separators are alternately arranged, the battery cells and the separators are securely held by bind bars or the like so that a battery block is provided.

Japanese Patent Laid-Open Publication No. JP 2010-287,550A discloses a battery block 210 that includes a plurality of rectangular battery cells 201, electrically-insulating separators 202 that are interposed between the rectangular battery cells 201 adjacent to each other, end plates 204 that are arranged on the end surfaces of a battery assembly constructed of the rectangular battery cells 201 and the separators 202, and bind bars 205 that couple the end plates 204 on the both end surfaces to each other, as shown in an exploded perspective view of FIG. 23 and a schematic cross-sectional view of FIG. 24. In addition, the separators 202 form cooling gas-flowing paths 206 between battery cells 201. Cooling air can flow through cooling gas-flowing paths 206 and cool the battery cells 201. In addition, the surfaces of each of the battery cells 201 are covered for electric insulation by a bag-shaped electrically insulating sheet 211 (e.g., PET resin etc.) as shown in an enlarged cross-sectional view of FIG. 24.

This battery block 210 is held by a strong force of the bind bars 205. Also, when the battery cells are charged/discharged with a large current, the battery cells 201 will expand as shown in the schematic cross-sectional view of FIG. 24. As a result, the exterior container surfaces of the battery cells 201 will be pressed by strong forces of the separators 202. In order to form the cooling gas-flowing paths 206, each of the separators 202 has a sectionally rectangular wave shape. If a strong force is applied to an edge part 207 of this rectangular wave shape, this edge part 207 may damage the electrically insulating sheet 211 (e.g., PET resin sheet), which covers the surfaces of the battery cell 201. If the electrically insulating sheet 211 is damaged, the damage may reduce the reliability of electrically insulation between the battery cells 201 adjacent to each other.

The present invention is aimed at solving the problem. It is a main object of the present invention to provide a reliability-improved power supply device that can protect the surfaces of an exterior container even if a force is applied by expansion of battery cells to the surfaces of the exterior case, and a vehicle including this power supply device.

SUMMARY OF THE INVENTION

To achieve the above object, a power supply device according to a first aspect of the present invention includes a plurality of battery cells, a separator, and a fastening member. The plurality of battery cells have a rectangular-box exterior shape. The separator is interposed between the plurality of battery cells, which are arranged side by side. The fastening member securely holds a battery assembly of the battery cells and the separators, which are alternately arranged side by side. The surfaces of each of the battery cells is covered by an electrically insulating covering member. The separator has recessed parts that form a plurality of gas-flowing paths between the battery cells so that cooling gas can flow along surfaces of these battery cells when this separator is interposed between these battery cells. Edge parts of the recessed part, which forms the gas-flowing path, are rounded (curved or bevel).

According to this construction, even if the battery assembly is pressed by a strong force of the fastening member when being securely held, of expansion of the battery cells, and the like, it is possible prevent that a covering member for covering the battery cell surface is damaged by edges of parts that form gas-flowing paths of the separators.

In a power supply device according to a second aspect of the present invention, the separator can have a plurality of gas-flowing grooves as the gas-flowing paths, which are formed on an opposed surface of the separator opposed to the battery cell and extend from one side to the other side of this separator, so that the gas-flowing paths can be formed between a main surface of the battery cell and the separator. The edge parts can be opening edges that extend along the extension direction of the gas-flowing grooves and are able to be in contact with the main surface of the battery cell.

According to this construction, since the opening edges of the gas-flowing grooves are rounded which are opposed to the battery cell and extend from one side to the other side of the separator, the rounded opening edges, which can be contact with long parts of the main surface of the battery cell, can prevent the contact parts of a covering member for covering the battery cell surface from being damaged.

In a power supply device according to a third aspect of the present invention, the separator can have a plurality of gas-flowing grooves as the gas-flowing paths, which are formed on an opposed surface of the separator opposed to the battery cell and extend from one side to the other side of this separator, so that the gas-flowing paths can be formed between a main surface of the battery cell and the separator. The edge parts can be opening end edges of the gas-flowing grooves and able to be in contact with the main surface of the battery cell.

According to this construction, since the opening end edges of the gas-flowing grooves are rounded which are opposed to the battery cell and extend from one side to the other side of the separator, the rounded opening edges, which can be contact with parts of the main surface of the battery cell, can prevent the contact parts of a covering member for covering the battery cell surface from being damaged.

In a power supply device according to a fourth aspect of the present invention, the separator can have cutout-shaped areas that are formed on the both sides so that the both end openings of each of the gas-flowing paths are located inside the side surfaces of the battery assembly.

According to this construction, the width between surfaces of adjacent battery cells opposed to each other can be large in the cutout-shaped areas on the both sides of the separator so that cooling gas flow drag can be small. For this reason, cooling gas can smoothly pass from the cutout-shaped area through the gas-flowing paths between the separator and the battery cells. Therefore, the battery cells can be effectively cooled. In particular, although the cutout-shaped areas are formed on the both sides of the separator so that the both ends of the gas-flowing path are opened at positions inside the side surfaces of the battery assembly, since the edge parts on the both ends of the part of the separator are rounded which corresponds to the gas-flowing path, it is possible to effectively prevent that these both end parts of a covering member for the battery cell surface are damaged.

In a power supply device according to a fifth aspect of the present invention, the separator can include an interposed plate portion that is sandwiched between the battery cells adjacent to each other. A plurality of gas-flowing grooves as the gas-flowing paths are alternately opened on the both surface sides of the interposed plate portion, and extend from one side to the other side of the interposed plate portion. The gas-flowing paths are formed between the gas-flowing grooves and main surfaces of opposed battery cells opposed to the gas-flowing grooves so that the gas-flowing paths are formed on the both surface sides of the interposed plate portion.

According to this construction, the battery cells that are arranged on the both surface sides of the separator can be effectively cooled by cooling gas that flows through the gas-flowing paths that are formed on the both surface sides of the separator. In particular, the exterior containers of the battery cells that are arranged on the both surface sides of the separator can be efficiently directly cooled.

In a power supply device according to a sixth aspect of the present invention, the interposed plate portion can include a plurality of cell press portions that are sandwiched between the battery cells adjacent to each other when the battery assembly is securely held, and a plurality of cell contact portions that are in contact with the main surfaces of the opposed battery cells. The cell press portions form side walls of the gas-flowing grooves, while the cell contact portions form the bottom surfaces of the gas-flowing grooves.

According to this construction, the cell press portions, which form the side walls of the gas-flowing grooves, can bear press forces acting on battery cells, while the cell contact portions, which form the bottom plates of the gas-flowing grooves, can press large areas of contact parts of the main surface of the battery cell that are located on the surfaces of the cell contact portions opposite to the gas-flowing paths.

In a power supply device according to a seventh aspect of the present invention, the cell press portions of the separator can be thicker than the cell contact portions.

According to this construction, since contact parts of the separator can be in contact with large areas of the battery cell, it is possible to improve the thermal conductivity of these contact parts. Also, since the bearing parts of the separator are thick, the bearing parts of the separator can have high stiffness. As a result, the bearing parts of the separator can apply sufficient forces whereby preventing the separator sandwiched between the battery cells from collapsing.

In a power supply device according to an eighth aspect of the present invention, the plurality of gas-flowing grooves, which are formed on the both surface sides of the interposed plate portion of the separator, can be sectionally rectangular U-shaped grooves. The interposed plate portion has a rectangular wave shape as viewed in section.

According to this construction, since the gas-flowing groove has a rectangular U shape as viewed in section, the cross-sectional area of the gas-flowing path can be large, while the separator can bear the press forces from the battery cells.

In a power supply device according to a ninth aspect of the present invention, the separator can include cell press portions that are located between the gas-flowing paths adjacent to each other, and sandwiched between the battery cells adjacent to each other. The cell press portions of the interposed plate portions of separators as the separator that are arranged on the both surface sides of the battery cell are arranged at positions on the both surface sides of this battery cell that are opposed to each other.

According to this construction, when the battery assembly is securely held by the fastening member, the cell press portions of the separators can press the opposed positions of the battery cell that is sandwiched between these separators from the both surface sides. Therefore, it is possible to surely hold the battery cell.

In a power supply device according to a tenth aspect of the present invention, the separator can include cell press portions that are located between the gas-flowing paths adjacent to each other, and sandwiched between the battery cells adjacent to each other. The cell press portions of the interposed plate portions of separators as the separator that are arranged on the both surface sides of the battery cell are arranged at positions on the both surface sides of this battery cell that are offset from each other.

According to this construction, when current collectors that are accommodated in the exterior containers of the battery cells expand, it is possible to avoid that the same part is pressed by the cell press portions of the separators. Thus, a pressed part can be deviated or deformed. Therefore, it is possible suppress that a too much load is applied to the current collector.

In a power supply device according to an eleventh aspect of the present invention, the separator can include the interposed plate portion, which is sandwiched between the battery cells adjacent to each other. Stress-relief recessed portions are formed on the both side parts of the interposed plate portion that are opposed to a sealing portion of the battery cell.

According to this construction, when the battery assembly is securely held from the both end surfaces by the fastening member, since the stress-relief recessed portions are formed on the side parts of the interposed plate portion, it is possible to prevent that the sealing-side side parts of the battery cells are pressed by a strong force. Therefore, it is possible to avoid that a stress is locally applied to the upper end part of the battery cell. In particular, in the case where the stress-relief recessed portion in the upper side parts of the interposed plate portion, it is possible to effectively prevent break and deformation of the edge of the upper surface side of the battery cell, in particular, break of the welded part between the sealing plate and the exterior container, and the like.

In a power supply device according to a twelfth aspect of the present invention, the separator can include the interposed plate portion, which is sandwiched between the battery cells adjacent to each other. Stress-relief recessed portions are formed on the both side parts of the interposed plate portion that are opposed to the bottom part of the battery cell.

According to this construction, when the battery assembly is securely held from the both end surfaces by the fastening member, since the stress-relief recessed portions are formed on the side parts of the interposed plate portion, it is possible to prevent that the bottom-side end parts of the battery cells are pressed by a strong force. Therefore, it is possible to avoid that a stress is locally applied to the lower part of the battery cell. In particular, in the case where the stress-relief recessed portion is formed in the lower end part of the interposed plate portion, it is possible to prevent that a strong forced is applied to a bottom surface part that extends along the bottom surface of the exterior container of the battery cell, and is less likely to deform. Therefore, it is possible to protect the exterior container of the battery cell, and additionally to surely hold the battery cell between the interposed plate portions.

In a power supply device according to a thirteenth aspect of the present invention, the plurality of gas-flowing paths can extend in straight lines and in parallel to each other.

According to this construction, since gas-flowing paths extend in straight lines and in parallel to each other, it is possible to reduce the flowing drag of cooling gas. Therefore, it is possible to efficiently cool the battery cells.

A vehicle according to a fourteenth aspect of the present invention includes the aforementioned power supply device, a driving electric motor, a vehicle body, and wheels. The driving electric motor is supplied with the electric power from this power supply device. The vehicle body accommodates the power supply device and the electric motor. The wheels are driven by the electric motor for vehicle traveling.

According to this vehicle, even if battery cell surfaces are pressed by a strong force of the fastening member when being securely held, of expansion of the battery cells, and the like, it is possible prevent that a covering member for covering the battery cell surface is damaged by edges of parts that form gas-flowing paths of the separators. In addition, if a force is applied to the battery cell surface and the separator in a direction that the battery cell surface and the separator are deviated from each other along the contact boundary in vehicle travelling, it is possible to avoid that a covering member for covering the battery cell surface is damaged.

An electric power storage according to a fifteenth aspect of the present invention includes the aforementioned power supply device.

According to this electric power storage, even when battery cell surfaces are pressed by a strong force of the fastening member when being fastened, of expansion of the battery cells, which are repeatedly charged/discharged, and the like, it is possible prevent that a covering member for covering the battery cell surface is damaged by edges of parts that form gas-flowing paths of the separators.

A separator according to a sixteenth aspect of the present invention is a separator to be interposed between battery cells that have a rectangular-box exterior shape, and are arranged side by side whereby electrically insulating the battery cells from each other. The separator includes an interposed plate portion that is to be sandwiched between the battery cells adjacent to each other when the separator is interposed between the battery cells. The interposed plate has recessed parts that form a plurality of gas-flowing paths between the battery cells so that cooling gas can flow along surfaces of these battery cells. Edge parts of the recessed part, which forms the gas-flowing path, are rounded.

The above and further objects of the present invention as well as the features thereof will become more apparent from the following detailed description to be made in conjunction with the accompanying drawings.

BRIEF DESCRIPTION OF THE DRAWINGS

FIG. 16 is a three-view drawing of the separator shown in FIG. 14, wherein

DETAILED DESCRIPTION OF THE EMBODIMENT(S)

The following description will describe embodiment according to the present invention with reference to the drawings. It should be appreciated, however, that the embodiments described below are illustrations of a power supply device, a power-supply-device separator, and power-supply-device-equipped vehicle and electric power storage to give a concrete form to technical ideas of the invention, and a power supply device, a power-supply-device separator, and power-supply-device-equipped vehicle and electric power storage of the invention are not specifically limited to description below. Furthermore, it should be appreciated that the members shown in claims attached hereto are not specifically limited to members in the embodiments. Unless otherwise specified, any dimensions, materials, shapes and relative arrangements of the members described in the embodiments are given as an example and not as a limitation. Additionally, the sizes and the positional relationships of the members in each of drawings are occasionally shown larger exaggeratingly for ease of explanation. Members same as or similar to those of this invention are attached with the same designation and the same reference signs, and their description is omitted. In addition, a plurality of structural elements of the present invention may be configured as a single part that serves the purpose of a plurality of elements, on the other hand, a single structural element may be configured as a plurality of parts that serve the purpose of a single element. Also, the description of some of examples or embodiments may be applied to other examples, embodiments or the like.

Figure 1:
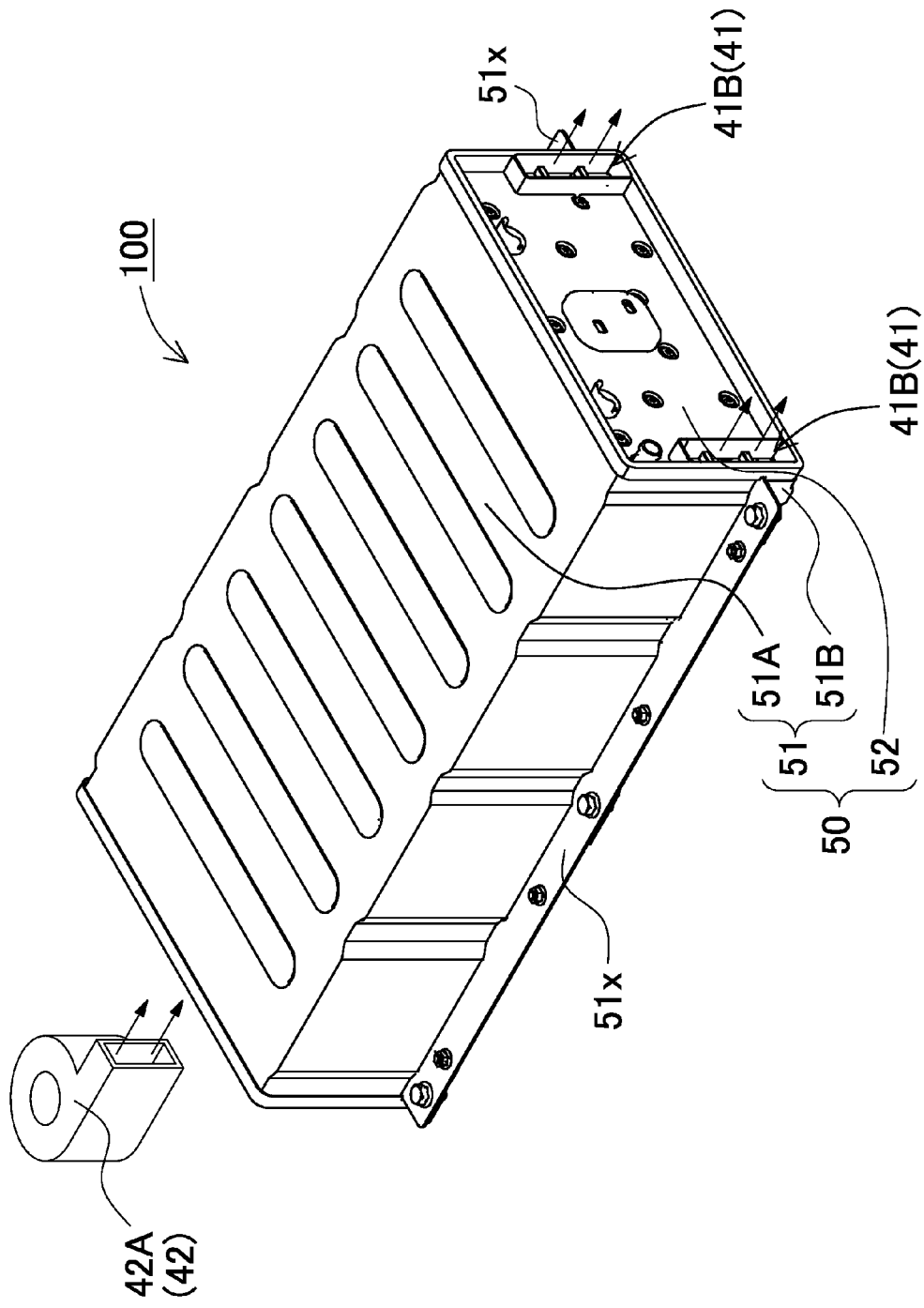
FIG. 1 is an external view showing a power supply device according to an embodiment of the present invention.
Figure 2:
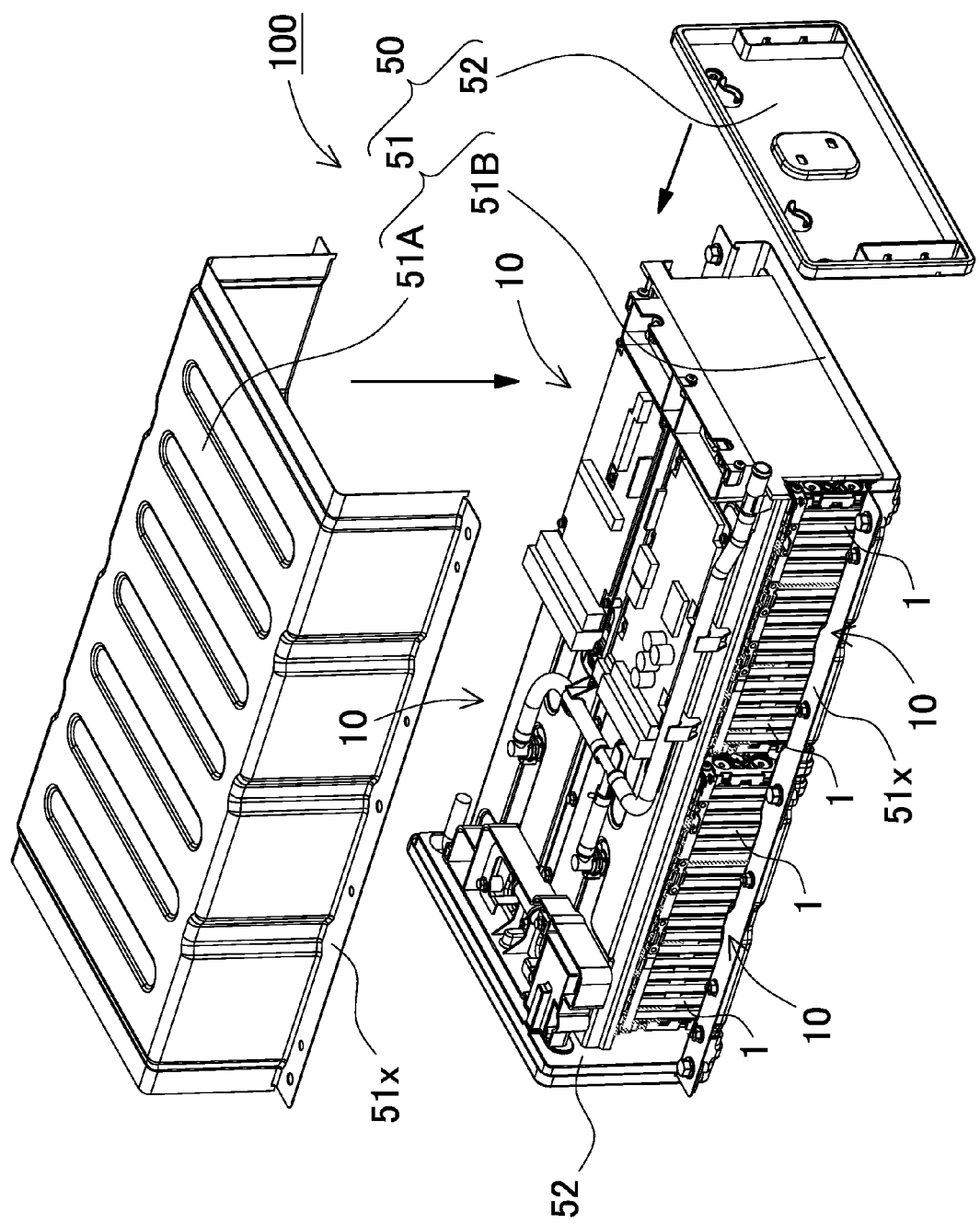
FIG. 2 is an exploded perspective view showing the power supply device shown in FIG. 1.
Figure 3:
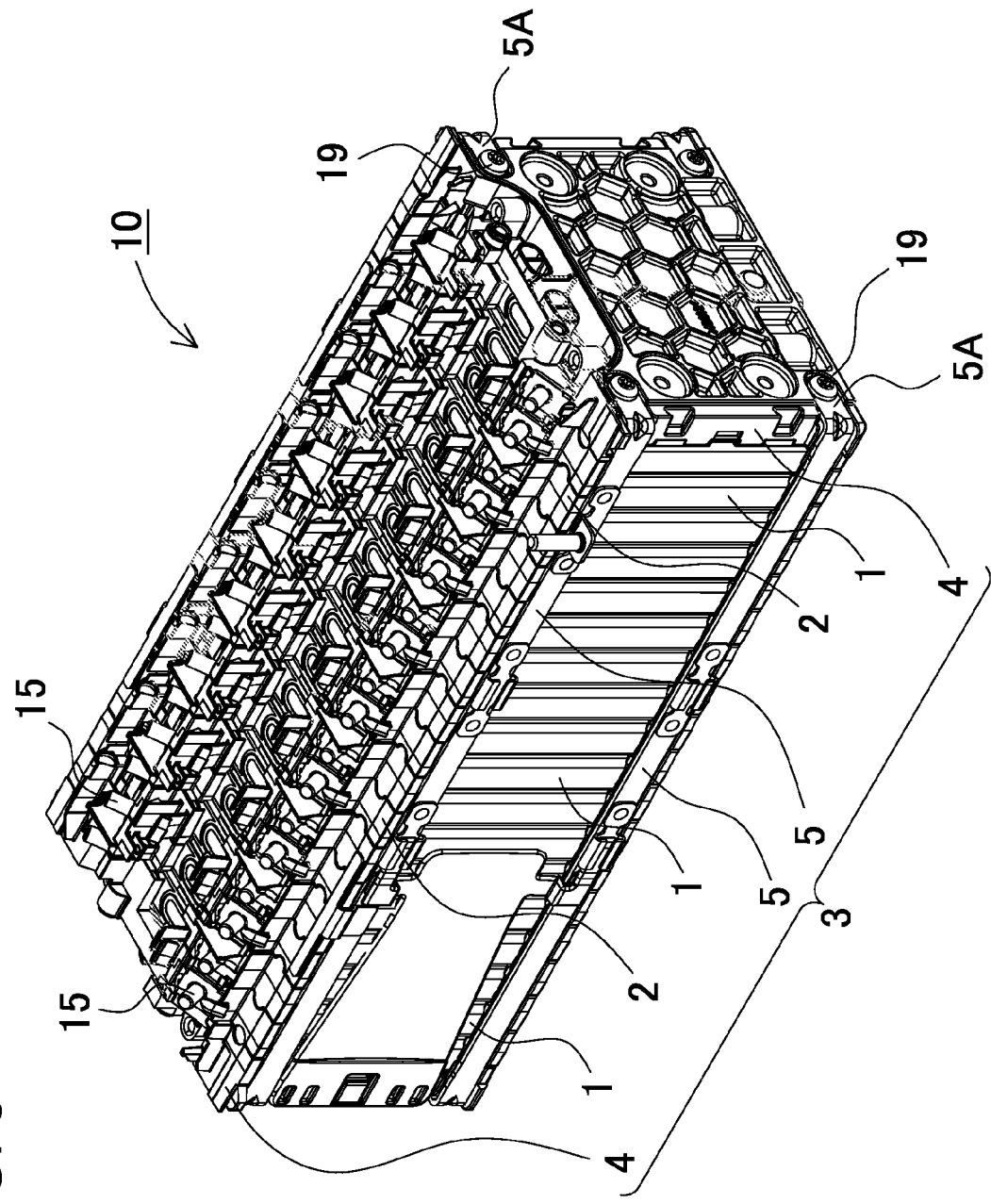
FIG. 3 is a perspective view showing a battery block shown in FIG. 2.
Figure 4:
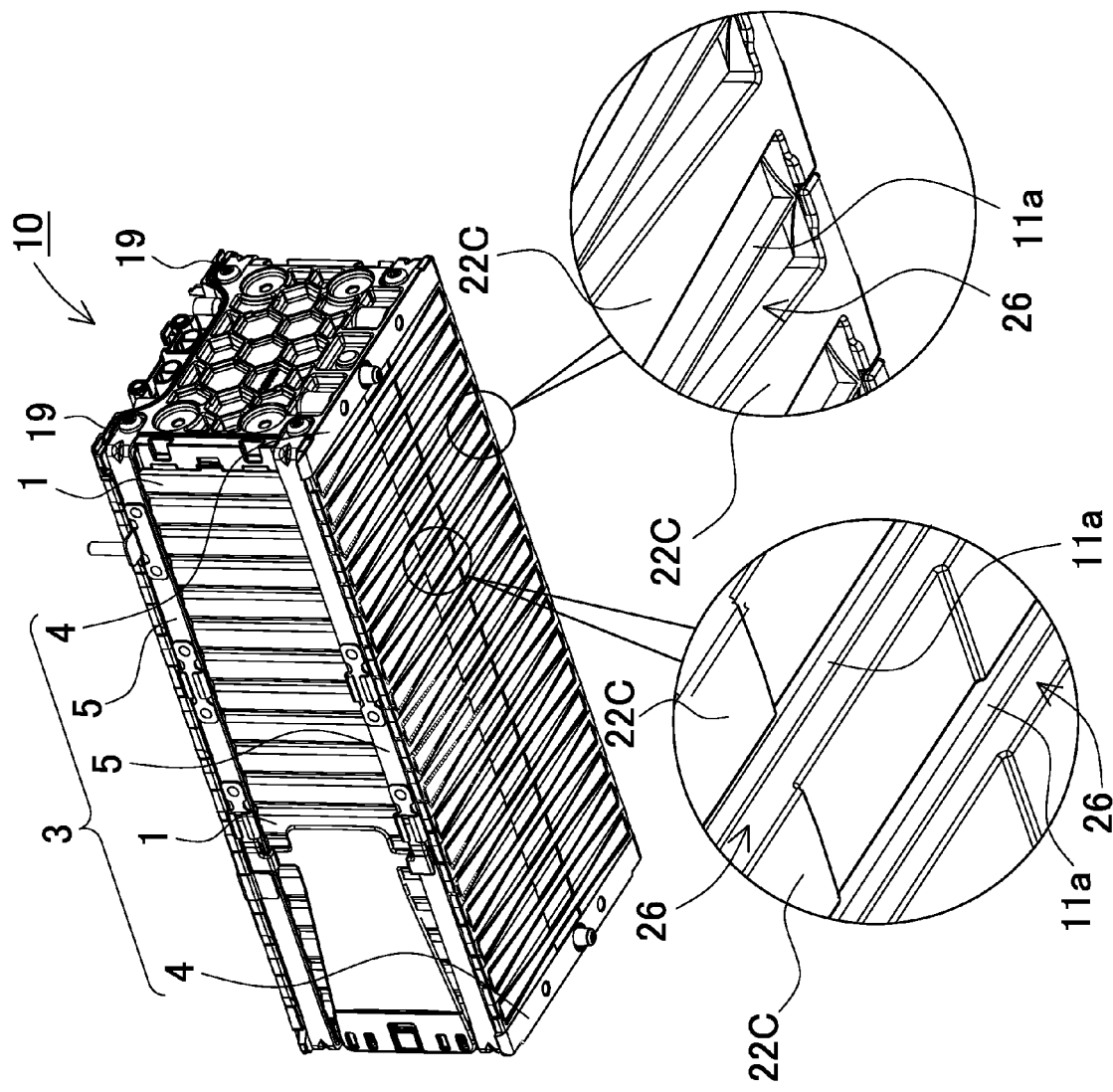
FIG. 4 is a partially enlarged perspective view showing the battery block shown in FIG. 3 as viewed from the bottom side.
Figure 5:
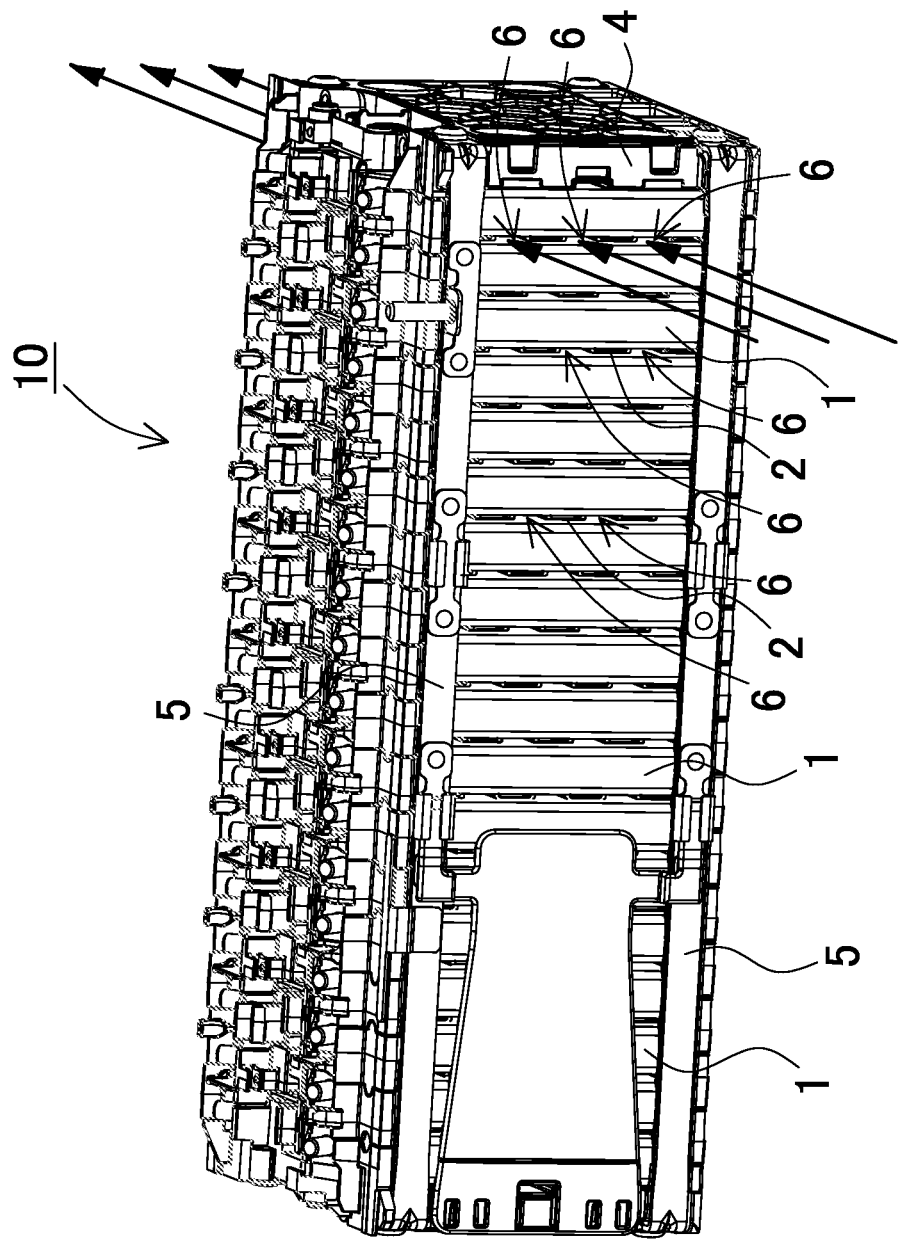
FIG. 5 is a perspective view showing gas-flowing paths of the battery block shown in FIG. 3.
Figure 6:
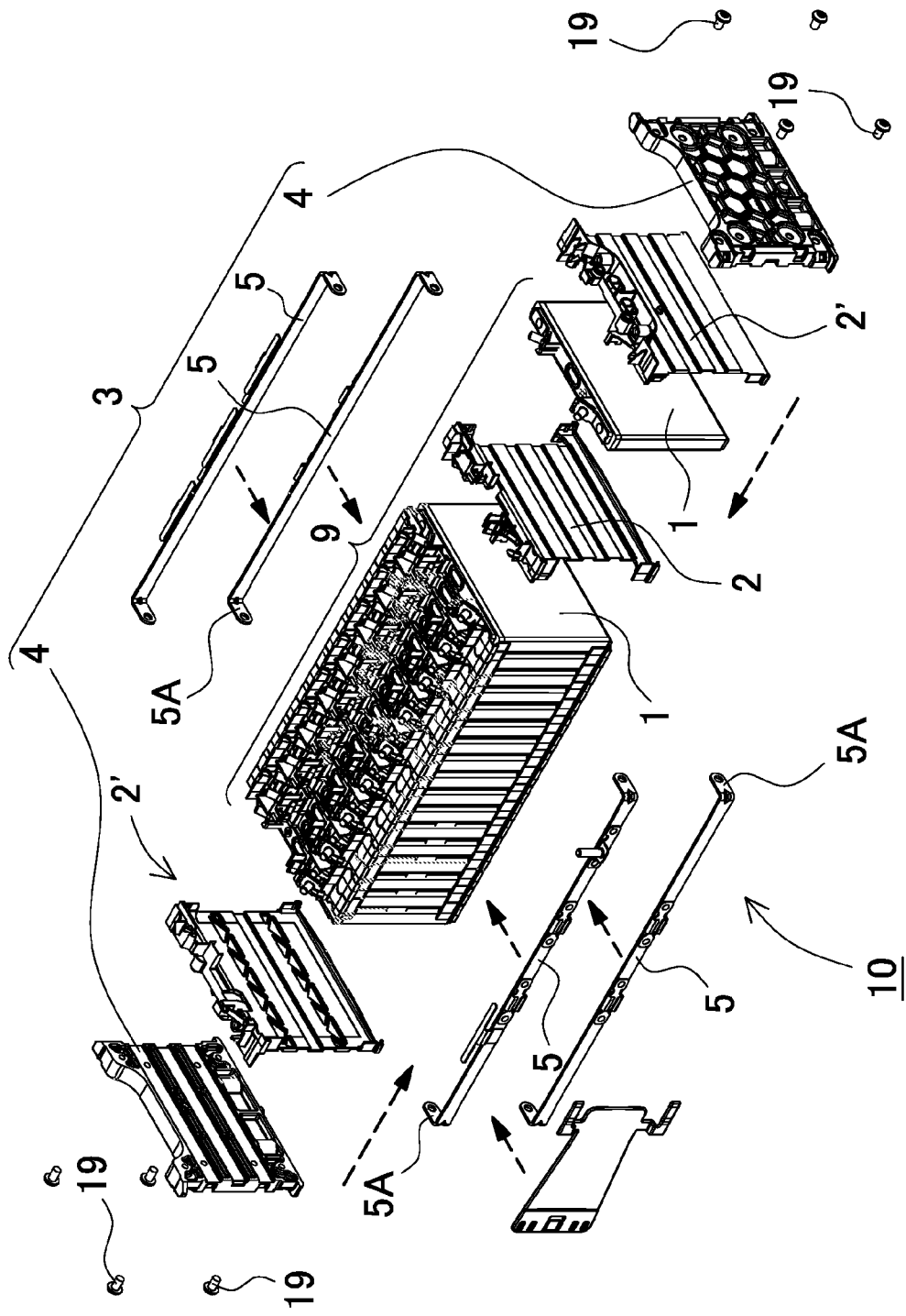
FIG. 6 is an exploded perspective view showing the battery block shown in FIG. 3.
Figure 7:
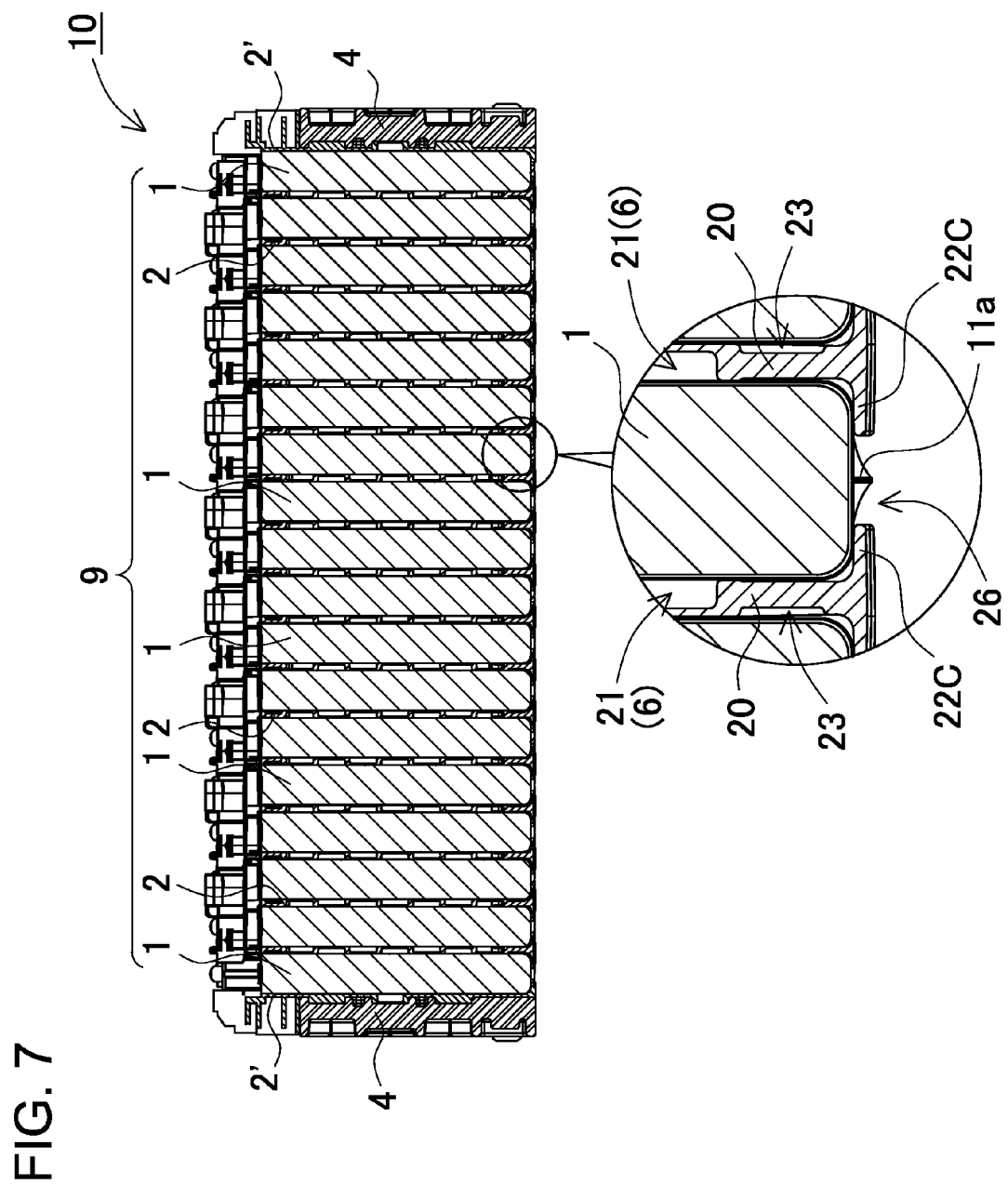
FIG. 7 is a partially vertical cross-sectional view showing the battery block shown in FIG. 3.
Figure 8:
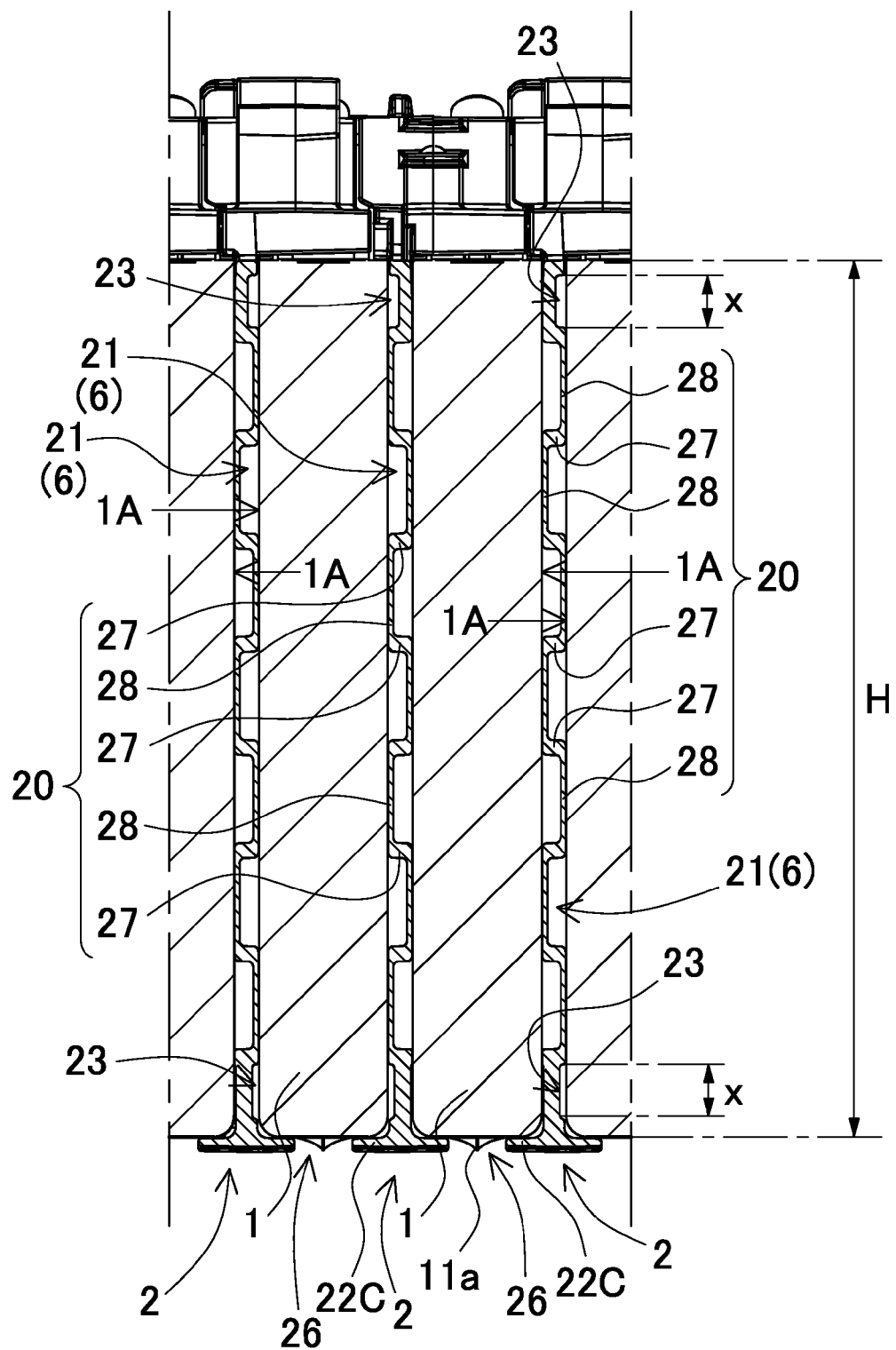
FIG. 8 is an enlarged cross-sectional view showing the battery block shown in FIG. 7.
Figure 9:
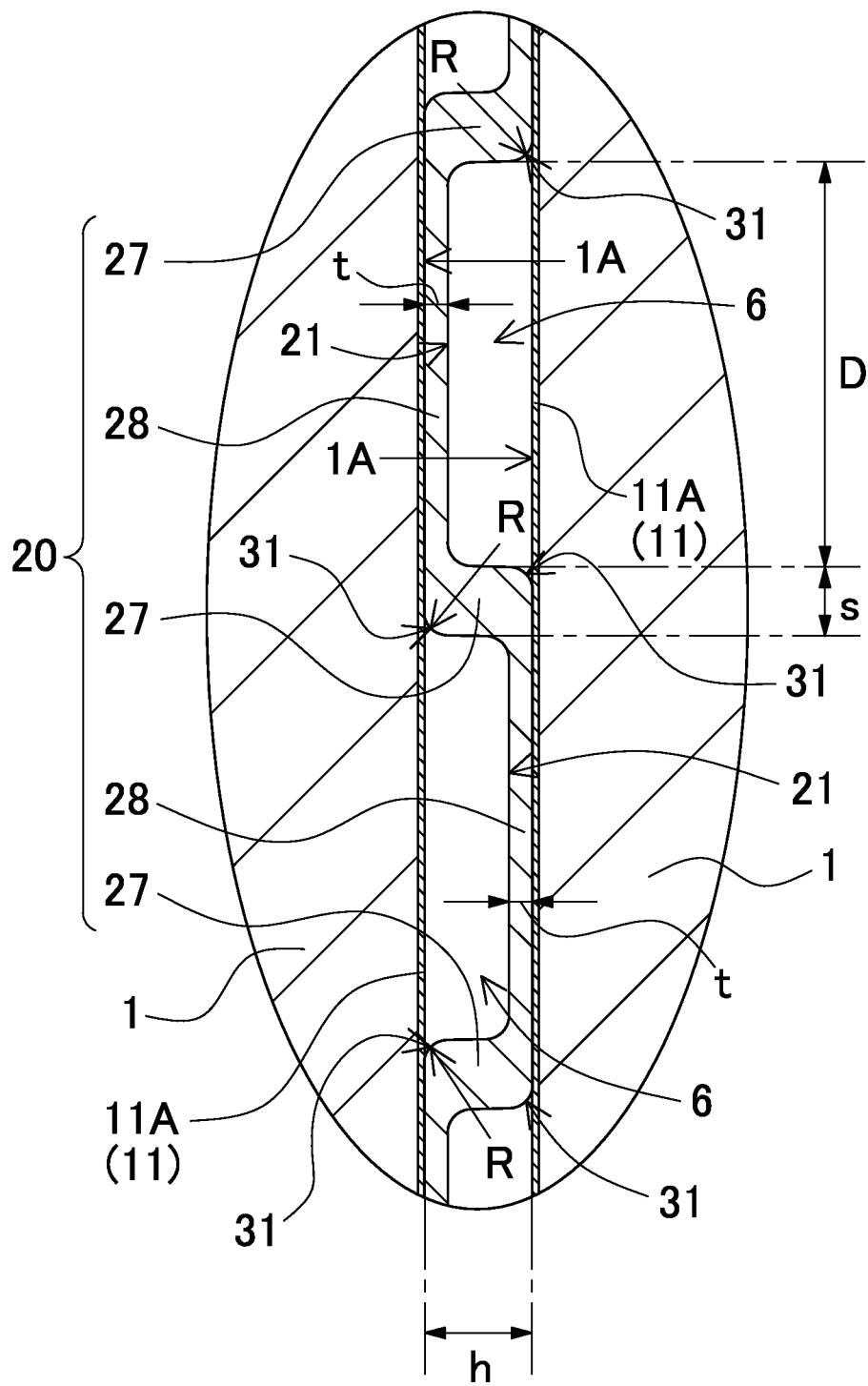
FIG. 9 is an enlarged cross-sectional view showing a particular part of the battery block shown in FIG. 8.
Figure 10:
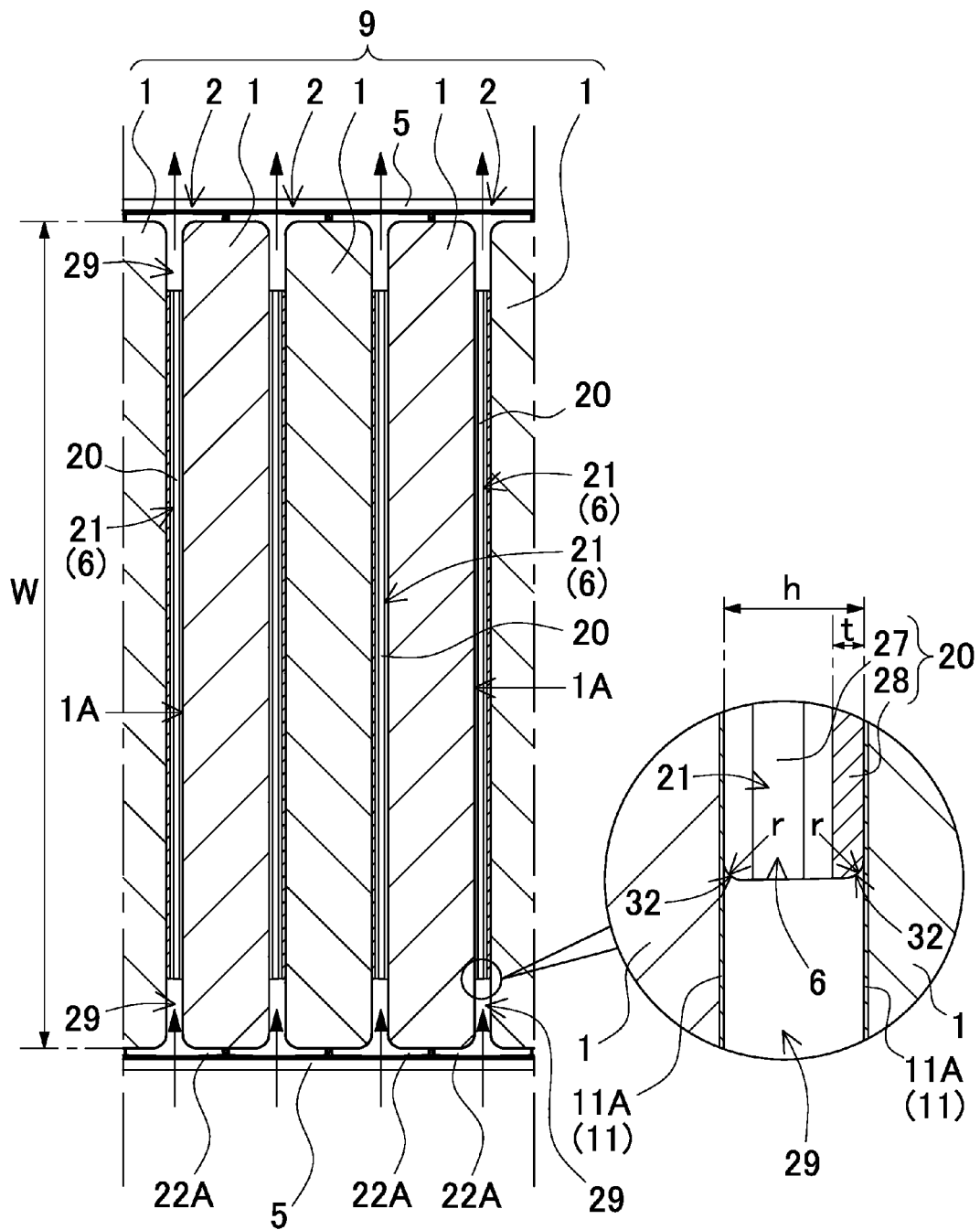
FIG. 10 is a partially enlarged, horizontal cross-sectional view showing the battery block shown in FIG. 7.
Figure 11:
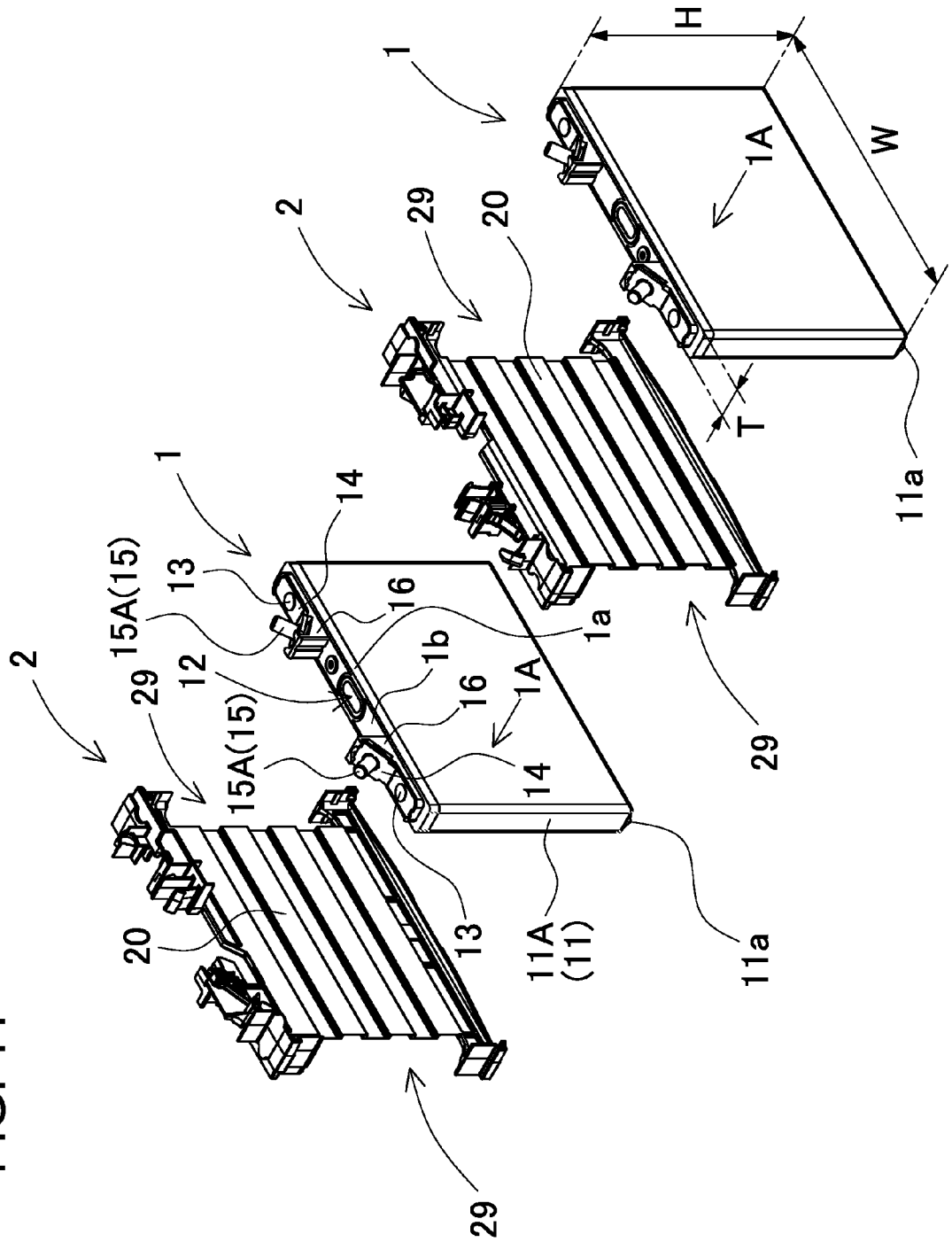
FIG. 11 is an exploded perspective view showing the side-by-side arrangement of battery cells and separators.

With reference to FIGS. 1 to 11, the following description will describe a vehicle power supply device to which a power supply device according to an embodiment of the present invention is adopted. FIG. 1 is an external view showing the power supply device. FIG. 2 is an exploded perspective view showing the power supply device shown in FIG. 1. FIG. 3 is an external perspective view showing a battery block of the power supply device shown in FIG. 2. FIG. 4 is a perspective view showing the battery block of FIG. 3 as viewed from the bottom side. FIG. 5 is a perspective view showing gas-flowing paths of the battery block shown in FIG. 3. FIG. 6 is an exploded perspective view showing the battery block shown in FIG. 3. FIG. 7 is a vertical cross-sectional view showing the battery block shown in FIG. 3. FIG. 8 is an enlarged cross-sectional view showing the battery block shown in FIG. 7. FIG. 9 is an enlarged cross-sectional view showing a particular part of the battery block shown in FIG. 8. FIG. 10 is a horizontal cross-sectional view of the battery block shown in FIG. 7. FIG. 11 is an exploded perspective view showing the side-by-side arrangement of battery cells and separators.

The illustrated power supply device is suitable mainly for power supplies of electric vehicles such as hybrid cars that are driven by both an internal-combustion engine and an electric motor, and electric vehicles that are driven only by an electric motor. However, a power supply device according to the present invention can be used for vehicles other than hybrid car and electric vehicle. In addition, a power supply device according to the present invention can be used for applications other than electric-type vehicles that require high power, for example, power supplies in stationary electric power storages that charge power supplies with electric power generated by natural power sources such as solar battery and aerogenerator.

(Battery Device)

As shown in the perspective view of FIG. 1, a battery device has a box external shape having a rectangular upper surface. This power supply device 100 accommodates one or a plurality of battery blocks 10 in an exterior case 50. The battery block 10 is fastened to this exterior case 50, and is arranged in place. The power supply device shown in the exploded perspective view of FIG. 2 includes four battery blocks 10, which are arranged in two columns and two rows. The exterior case 50 include an exterior case portion 51 that includes sectionally rectangular U-shaped lower and upper case sections 51B and 51A. The exterior case portion 51 covers the upper and lower surfaces and side surfaces of an assembly of the battery blocks 10. The both end surfaces of the exterior case portion 51 are closed by end surface covers 52. In addition, flanges 51x are formed on the longitudinal side surfaces of the exterior case portion 51, and protrude perpendicular to these longitudinal side surfaces. The flanges 51x facilitate installation of the power supply device on vehicles. The flange 51x has screw holes that are opened to receive screws. Thus, the power supply device can be easily fastened by screws that engage with the screw holes.

(Battery Block)

As shown in FIGS. 3 to 11, the battery block 10 includes a plurality of battery cells 1, separators 2, and fastening members 3. The plurality of battery cells 1 have a rectangular box exterior shape. The plurality of battery cells 1 are arranged side by side. The separators 2 are interposed between the plurality of battery cells 1. The plurality of battery cells 1 and the separators 2 are alternately arranged side by side. The fastening members 3 securely hold a battery assembly 9 of the plurality of battery cells 1 and the separators 2. In the illustrated battery block 10, when the plurality of battery cells 1 of rectangular batteries are arranged side by side, gas-flowing paths 6 are formed. In this power supply device, cooling gas flows through the gas-flowing paths 6 so that the battery cells 1 are cooled.

(Battery Cell 1)

The battery cell 1 is a flat rectangular battery, which has a rectangular box exterior shape the thickness of which is smaller than the width. The rectangular battery cells 1 are arranged side by side, and orientated in parallel to each other. The separators 2 are sandwiched between the battery cells 1. Thus, the battery assembly 9 is constructed of the battery cells 1 and the separators 2. The battery cell 1 is a lithium-ion rechargeable battery. However, the battery cell is not limited to a lithium-ion rechargeable battery. Any rechargeable batteries (e.g., nickel metal hydride batteries) can be also used. The battery cell 1 includes electrode members of positive/negative electrode plates that overlap each other. After the electrode members are accommodated in an exterior container 1a, the exterior container 1a is airtightly sealed. The exterior container 1a is formed of an upwardly opened rectangular box shape the top opening of which is airtightly closed by a metal sealing plate 1b, as shown in FIG. 11. The exterior container 1a is formed by subjecting a metal plate (e.g., aluminum or aluminum alloy) to deep drawing. The sealing plate 1b is also formed from a metal plate such as aluminum or aluminum alloy similar to the exterior container 1a. After the sealing plate 1b is inserted into the opening of the exterior container 1a, the boundary between the outer periphery of the sealing plate 1b and the inner periphery of the exterior container 1a is subjected to laser beam irradiation. Thus, the sealing plate 1b is fastened to the exterior container 1a by laser welding so that the exterior container 1a is airtightly sealed by the sealing plate 1b.

Positive/negative electrode terminals 13 are secured to and protrude from the both side parts of sealing plate 1b, as shown in FIG. 11. The positive/negative electrode terminals 13 are arranged on the upper surface of the sealing plate 1b, and connected to the positive/negative output terminals 15 through connection leads 14, as shown in FIG. 11. Thus, the positive/negative output terminals 15 are connected to the positive/negative electrode plates, which are accommodated in the exterior container, through the connection leads 14 and the electrode terminals 13. The positive/negative output terminals 15 are fastened onto the both sides of the upper surface of the sealing plate 1b through terminal holders 16. The positive/negative electrode terminals of the output terminals 15, which are fastened onto the upper surface of the battery cell 1, are arranged horizontally symmetric with respect to the center line. According to this arrangement, in the case where the battery cells 1 are arranged side by side with being flipped from side to side, the positive and negative output terminals 15 of one of the battery cells are serially connected to the negative and positive output terminals 15 of another battery cell adjacent to the one of the battery cells by metal plate bus bars. Alternatively, the positive and negative output terminals 15 of one of the battery cells can be directly serially connected to the negative and positive output terminals 15 of another battery cell adjacent to the one of the battery cells. In the case of the battery block 10 in which the battery cells 1 are serially connected to each other, the output voltage of the battery block can be high, and as a result the battery block can provide high power. Note that, in the battery block according to the present invention, battery cells adjacent to each other may be connected both in parallel and in serial to each other.

(Heat Contraction Sheet)

Figure 12:
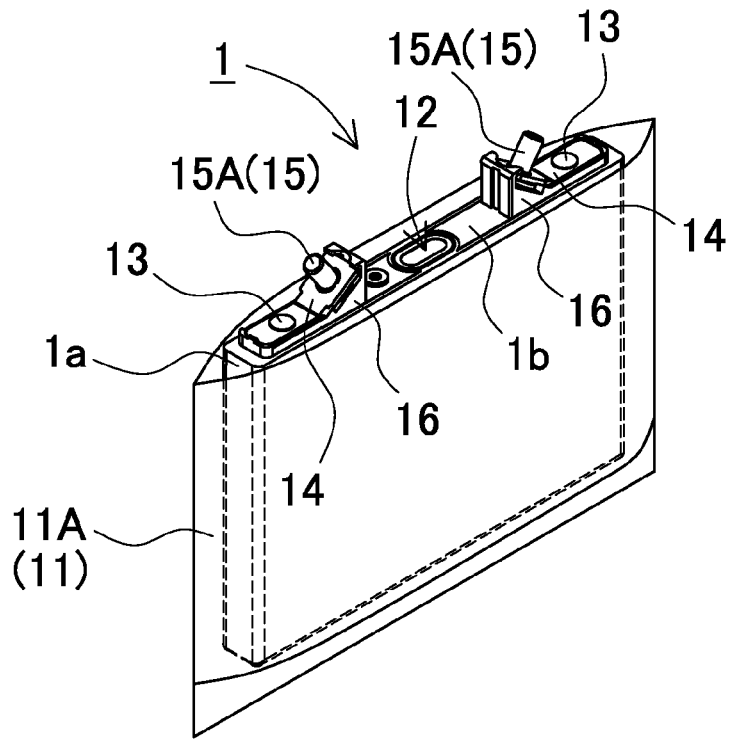
FIG. 12 is a perspective view showing the battery cell to be covered with a heat contraction sheet.

The battery cell 1 includes the exterior container 1a of metal plate so that the metal surfaces of the exterior container 1a are exposed. The surfaces of the battery cell 1 are covered by the electrically insulating covering member 11. The battery cell 1 shown in FIG. 12 is covered by a heat contraction sheet 11A that is formed of an electrically insulating sheet (e.g., PET resin sheet) as the electrically insulating covering member 11. After the battery cell 1 is inserted into the tube-shaped heat contraction sheet 11A, the heat contraction sheet 11A is welded under the bottom surface of the battery cell 1 by heat welding so that the bottom surface of the battery cell 1 is sealed. After that, the heat contraction sheet 11A is heated, and brought into tight contact with the surfaces of the battery cell 1. As shown in an enlarged sectional view of FIG. 13, the welded part 11a of the heat contraction sheet 11A protrudes from the bottom surface of the battery cell 1, which is covered by the heat contraction sheet 11A.

(Terminal Holder 16)

The terminal holder 16 has a substantially triangular prism shape that has an inclined surface. Thus, the connection lead 14 is arranged in a predetermined position on the electrode terminal 13. The output terminal 15 is fastened onto the connection lead 14. The periphery of the terminal holder 16 on the upper surface of the battery cell 1 is electrically insulated except for the protruding part of the output terminal 15. The output terminal 15 shown in FIG. 11 is a fastening screw 15A. The thread part of this fastening screw 15A passes through the connection lead 14, and protrudes upward of the inclined surface of the terminal holder 16 in a slanting direction. The terminal holder 16 is formed of an electrically-insulating material such as plastic. The output terminal 15 is arranged on the inclined surface of the terminal holder 16. The output terminals 15 are arranged at predetermined positions on the both end parts of the battery cell 1, and protrude upward in a slanting direction. The positive/negative electrode terminals 13 are connected to the positive/negative electrode plates, which are accommodated in the exterior container.

(Separator 2)

The separator 2 is interposed between the battery cells 1 adjacent to each other, as shown in FIGS. 6 to 11. Thus, the adjacent battery cells 1 are spaced at a predetermined interval away from each other, and are electrically insulated from each other. To achieve this, the separator 2 is formed of an eclectically insulating material. Thus, the separator 2 electrically insulates the exterior containers 1a of the adjacent battery cells 1 from each other. The separator 2 can be formed of an electrically-insulating material such as plastic by molding. Each of the separators 2 has recessed parts that form the gas-flowing paths 6 between the battery cells 1 so that cooling gas can flow along surfaces of these battery cells 1 when this separator 2 is interposed between these battery cells 1. The separator 2 shown in FIGS. 7 to 11 and 14 to 16 has gas-flowing grooves 21. The gas-flowing grooves 21 are formed on an opposed surface of the separator 2 that is opposed to the battery cell 1. The gas-flowing grooves 21 extend from one side to the other side of the separator 2. Thus, the gaps between the gas-flowing grooves 21 and a main surface 1A of the battery cell 1 serve as the gas-flowing paths 6. As shown in FIGS. 10 and 17, the gas-flowing paths 6 extend in the horizontal direction, and are opened on the right and left side surfaces of the battery assembly 9 (battery block 10).

The separator 2 shown in FIGS. 7 to 11 and 14 to 17 includes an interposed plate portion 20 that is sandwiched between the battery cells 1 adjacent to each other. The gas-flowing grooves 21 are alternately opened on the both surface sides of the interposed plate portion 20 so that the gas-flowing paths 6 are formed on the both surface sides of the interposed plate portion 20. The gas-flowing paths 6, which are formed on the both surface sides of the interposed plate portion 20, extend in straight lines and in parallel to each other. The thus-configured power supply device has a feature that the battery cells 1 on the both surface sides of the separator 2 can be effectively cooled by the gas-flowing paths 6, which are formed on the both surface sides of the separator 2. However, the gas-flowing grooves may be formed only on one surface side of the separator so that the gas-flowing paths can be formed between the battery cell and the separator.

The gas-flowing grooves 21, which are formed on the both surface sides of the interposed plate portion 20 of the illustrated separator 2, are sectionally rectangular U-shaped grooves. The interposed plate portion 20 has a rectangular wave shape as viewed in section. As shown in the enlarged cross-sectional view of FIG. 9, the interposed plate portion 20 includes a plurality of cell press portions 27, and a plurality of cell contact portions 28. The cell press portions 27 are sandwiched between the battery cells 1 adjacent to each other when the battery assembly 9 is securely held. The cell contact portions are in contact with the main surfaces 1A of the opposed battery cells 1. The cell press portions 27 are formed in a rib shape that extends in the longitudinal direction of the gas-flowing groove 21, and serve as the both side walls of the gas-flowing grooves 21. The cell contact portion 28 is formed in a narrow plate shape that extends in the longitudinal direction of the gas-flowing groove 21. Thus, the cell contact portion 28 forms the bottom plate of the gas-flowing groove 21 that is opened toward the side of the interposed plate portion 20 opposite to this cell contact portion. The cell press portions 27 are coupled to each other by the cell contact portions 28, which are arranged alternately on the both surface sides of the illustrated interposed plate portion 20, so that the interposed plate portion 20 has a rectangular wave shape as viewed in section. Thus, the gas-flowing paths 6 are alternately formed on the both surface sides of the interposed plate portion 20 of the illustrated separator 2. In other words, the cell press portions 27 are coupled to each other by the cell contact portions 28, which are alternately arranged on the both surface sides of the interposed plate portion, so that the interposed plate portion has recessed parts (sectionally U-shaped grooves that are alternately opened on the both surface sides of the interposed plate portion). After the separators 2 are arranged side by side between the battery cells 1 adjacent to each other, when the battery assembly 9 is securely held from the both end surface sides, the surface sides of the cell press portions 27 are brought in contact with and are pressed by the main surfaces 1A of the adjacent battery cells 1 that are opposed to the surface sides of the cell press portions 27. Thus, the openings of the gas-flowing grooves 21 of the separator 2 are closed by the main surface 1A of the battery cell 1 opposed to the separator 2 so that the gas-flowing paths 6 are formed by the gas-flowing grooves 21, while the cell contact portions 28, which are located on the opposite side to the openings of the gas-flowing grooves 21 and serve as the bottom plates of the gas-flowing grooves 21, are in contact with and pressed by the main surface 1A of this battery cell 1. According to this separator 2, since the cell contact portion 28 wider than with the cell press portion 27 is in contact with the main surface 1A of the battery cell 1, the contact surface area between the separator 2 and the battery cell 1 can be large. As a result, it is possible to reduce pressure that is applied onto the exterior container 1a of the battery cell 1.

It is preferable that the thickness (s) of the cell press portion 27 of the interposed plate portion 20 be larger than the thickness (t) of the cell contact portion 28. According to this construction, since contact parts of the separator 2 can be in contact with large areas of the battery cell 1, it is possible to improve the thermal conductivity of these contact parts. Also, since the bearing parts of the separator 2 are thick, the bearing parts of the separator 2 can have high stiffness. As a result, the bearing parts of the separator 2 can apply sufficient forces whereby preventing the separator 2 sandwiched between the battery cells 1 from collapsing. In the case where the separators 2 are arranged side by side on the battery cells 1 that have a width (W) of 120 mm, and a height (H) of 85 mm, the height (h) of the cell press portion 27 corresponding to the thickness of the interposed plate portion 20, the thickness (s) of the cell press portion 27, and the thickness (t) of the cell contact portion 28 are set to 2.3 mm, 1.5 mm, and 0.5 mm, respectively. In addition, the interval between the cell press portions 27, that is, the width (D) of the gas-flowing path 6 is set to 8.5 mm.

Also, the edge parts of the separator 2 that form the gas-flowing paths 6 are rounded. As shown in the enlarged cross-sectional view of FIG. 9, the opening edges of the gas-flowing grooves 21 of the separator 2 are rounded. The opening edges of the gas-flowing grooves 21 extend along the longitudinal direction of the gas-flowing grooves 21, and can be in contact with the main surface 1A of the battery cell 1. In other words, the corners of the cell press portion 27 of the separator 2 are rounded. The cell press portion 27 forms the side wall of the gas-flowing groove 21. The illustrated rounded part 31 is formed in a curved surface having a predetermined curvature radius (R). The illustrated curved surface has a curvature radius (R) substantially equal to or slightly smaller than the thickness (t) of the cell contact portion 28. In the case where the curvature radius (R) of the rounded part 31 of the curved surface is large, it is possible to effectively prevent that the covering member 11 for covering the battery cell 1 surface is damaged. On the other hand, in the case where the curvature radius (R) is small, the press area of the cell press portion 27 for pressing the battery cell 1 surface can be large so that the pressure that is locally applied onto the battery cell 1 can be small. From this viewpoint, it is preferable that the curvature radius (R) of the rounded part 31 of the curved surface be set to not smaller than one-third of the thickness (t) of the cell contact portion 28, more preferably to not smaller than one half the thickness (t) of the cell contact portion 28, and to not larger than one half of the thickness (s) of the cell press portion 27, more preferably to not larger than one-third the thickness (s) of the cell press portion 27. Accordingly, in the case where the thickness (t) of the cell contact portion 28, and the thickness (s) of the cell press portion 27 of the separator 2 are 0.5 mm, and 1.5 mm, respectively, the curvature radius (R) of the curved surface is set to the range of 0.17 to 0.75 mm, preferably to the range of 0.25 to 0.5 mm. However, the rounded part is not limited to the curved surface, but can be a bevel.

In addition, as shown in the enlarged cross-sectional view of FIG. 10, the opening end edges of the gas-flowing grooves 21 of the separator 2 are rounded. The opening end edges of the gas-flowing groove 21 are the edges of horizontal opened ends of the gas-flowing groove 21, and can be in contact with the main surface 1A of the battery cell 1. In other words, the corners of the side ends of the cell contact portion 28 of the separator 2 are rounded. The corners of the side ends of the cell contact portion 28 are the corners of the both ends of the cell contact portion 28, and can be in contact with the main surface 1A of the battery cell 1. The illustrated rounded part 32 is formed in a curved surface having a predetermined curvature radius (r). The illustrated curved surface has a curvature radius (r) substantially equal to or slightly smaller than the thickness (t) of the cell contact portion 28. It is preferable that the curvature radius (r) of the rounded part 32 of the curved surface be set to the range of one-third to twice the thickness (t) of the cell contact portion 28, more preferably to the range of one half to one-and-a-half times the thickness (t) of the cell contact portion 28. Accordingly, in the case where the thickness (t) of the cell contact portion 28 of the separator 2 is 0.5 mm, the curvature radius (r) of the curved surface is set to the range of 0.17 to 1.0 mm, preferably to the range of 0.25 to 0.75 mm. However, the rounded part is not limited to the curved surface, but can be a bevel.

As discussed above, in the case where the gas-flowing grooves 21 are arranged in the surface of the separator 2 so that the gas-flowing paths 6 are formed between the gas-flowing grooves 21 and the main surface 1A of the battery cell 1 opposed to the gas-flowing grooves 21, since the edge parts of the separator 2 that form the gas-flowing paths 6 are rounded, it is possible to effectively prevent that the covering member 11 for covering the battery cell 1 surface is damaged. In particular, even when the battery assembly 9 is securely held by a strong force of the fastening member 3, or even when the surface of the separator 2 is pressed onto the surface of the battery cell 1 by a strong force of expansion of the battery cell 1, or the like, it is possible to prevent that the covering member 11 for covering battery cell 1 surfaces is damaged by the edge parts of the separator 2. As a result, it can be ensured that the covering member 11 of the battery cell 1 is protected. Therefore, the battery cell 1 can be held electrically insulated for a long time.

In addition, cutout-shaped areas 29 are formed on the both side parts of the separator 2 shown in FIGS. 10 and 14 to 17 so that the both opened ends of the gas-flowing path 6 are opened at positions inside the side surfaces of the battery assembly 9. In the illustrated interposed plate portion 20, the cutout-shaped areas 29 are formed in a cutout shape in parts in proximity to the both side surfaces of the battery assembly 9 so that the battery cell 1 is exposed in these parts. Since the cutout-shaped areas 29 are formed on the both side parts of the separator 2 so that the both side parts other than the corner parts of the separator 2 are located inside the side edges of the main surface 1A of the battery cell 1, the inlet and outlet of the gas-flowing path 6 can be large although the strength of the separator 2 can be maintained. As a result, it is possible to suppress turbulent flow or the like, and to reduce pressure loss caused by turbulent flow. In particular, in the case where the cooling gas flows through the later-discussed gas-flowing duct, and is guided into narrow slits, the loss will be large. In addition, when the cooling gas flow turns from the side-by-side arrangement direction of the battery cells 1 to a direction perpendicular to this side-by-side arrangement direction, the loss will be also large. To prevent this, the cutout-shaped area 29 is formed on the inlet side of the separator 2 so that sufficient space is surely provided on the inlet sides of the gas-flowing paths 6. According to this construction, the cooling gas can be temporarily held in this space, and then guided into the gas-flowing paths 6. As a result, the pressure loss can be reduced. Therefore, the cooling gas can be more smoothly guided. In addition, since a large cutout-shaped area is also opened on the outlet side of the separator, the pressure loss can be reduced. In particular, although the cutout-shaped areas 29 are formed on the both sides of the interposed plate portion 20 of the separator 2, since the edge parts on the both ends of the part of the separator 2 that are opened at positions inside the side surfaces of the battery assembly 9 are rounded, it is possible to effectively prevent that these both end parts of the covering member for the battery cell surface are damaged.

Since the cutout-shaped areas 29 are formed in the separator 2 in a cutout shape that corresponds to a shape obtained by cutting out band-shaped parts of constant width from the side edge of the separator 2, a large area of the main surface of the battery cell 1 can be covered by the separator 2. Accordingly, electric insulation between the battery cells 1 can be maintained. The exposed parts of the exterior container 1a that is exposed through the cutout-shaped areas 29 are located on the both side parts of the exterior container 1a. The strength of these both side parts of the exterior container 1a is relatively high. For this reason, even when the battery cell 1 expands to some extent, deformation of these both side parts of the exterior container 1a is relatively small. As a result, it is possible to prevent that the battery cells 1 come in contact with to each other.

Figure 14:
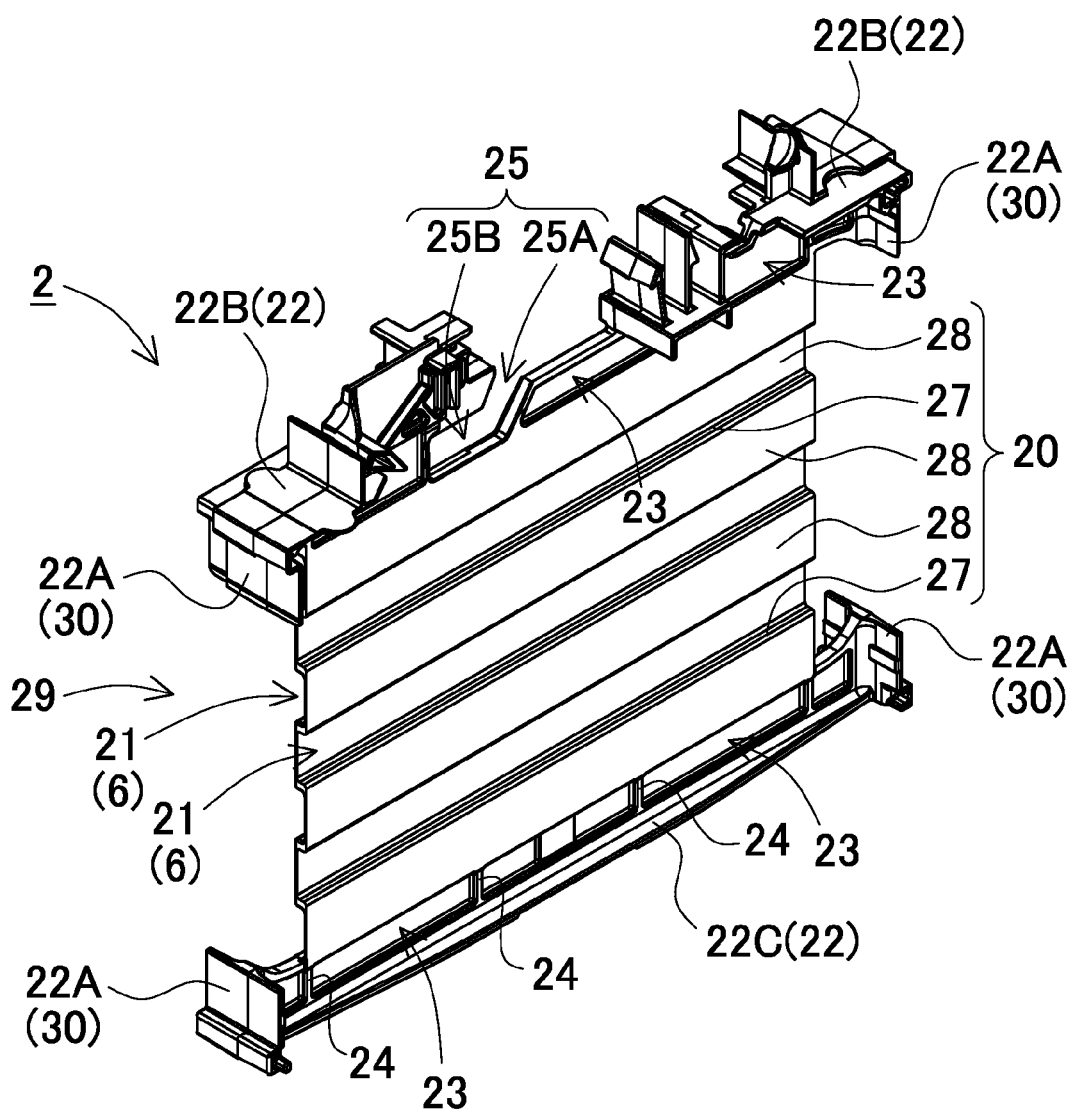
FIG. 14 is a perspective view of the separator shown in FIG. 11.
Figure 15:
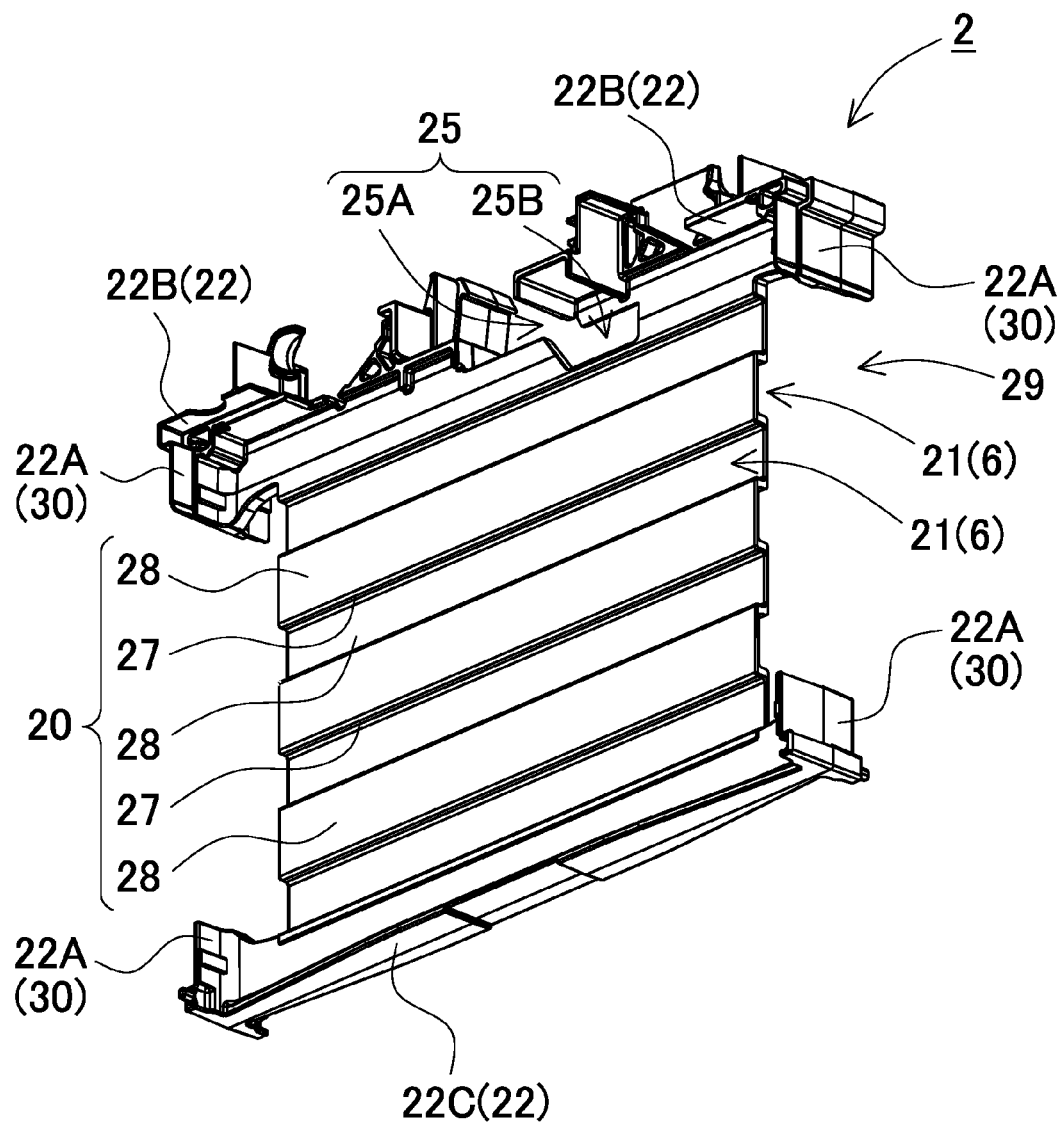
FIG. 15 is a perspective view showing the back surface of the separator shown in FIG. 14 as viewed from the bottom side.
Figure 16A:
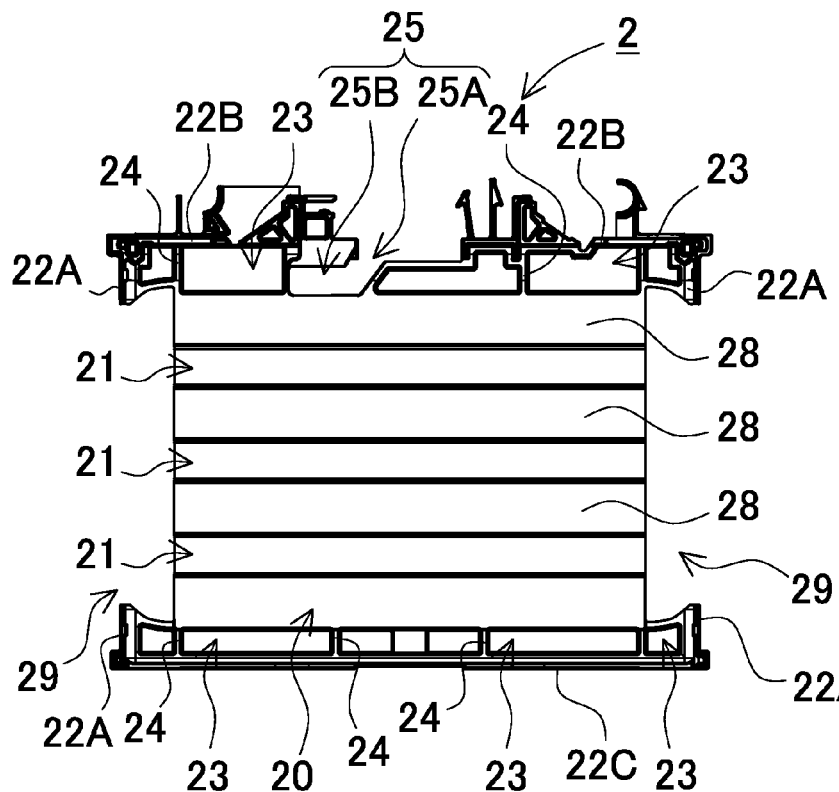
FIGS. 16(a), 16(b), and 16(c) are front, side, and bottom views, respectively.
Figure 16B:
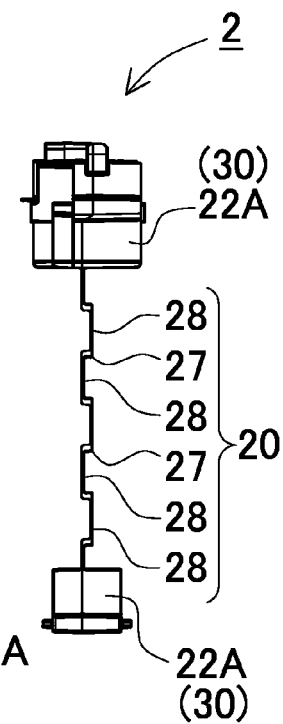
Figure 16C:
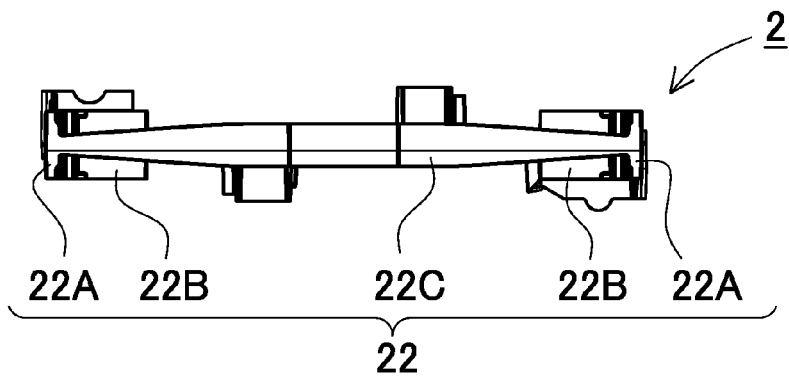
Figure 17:
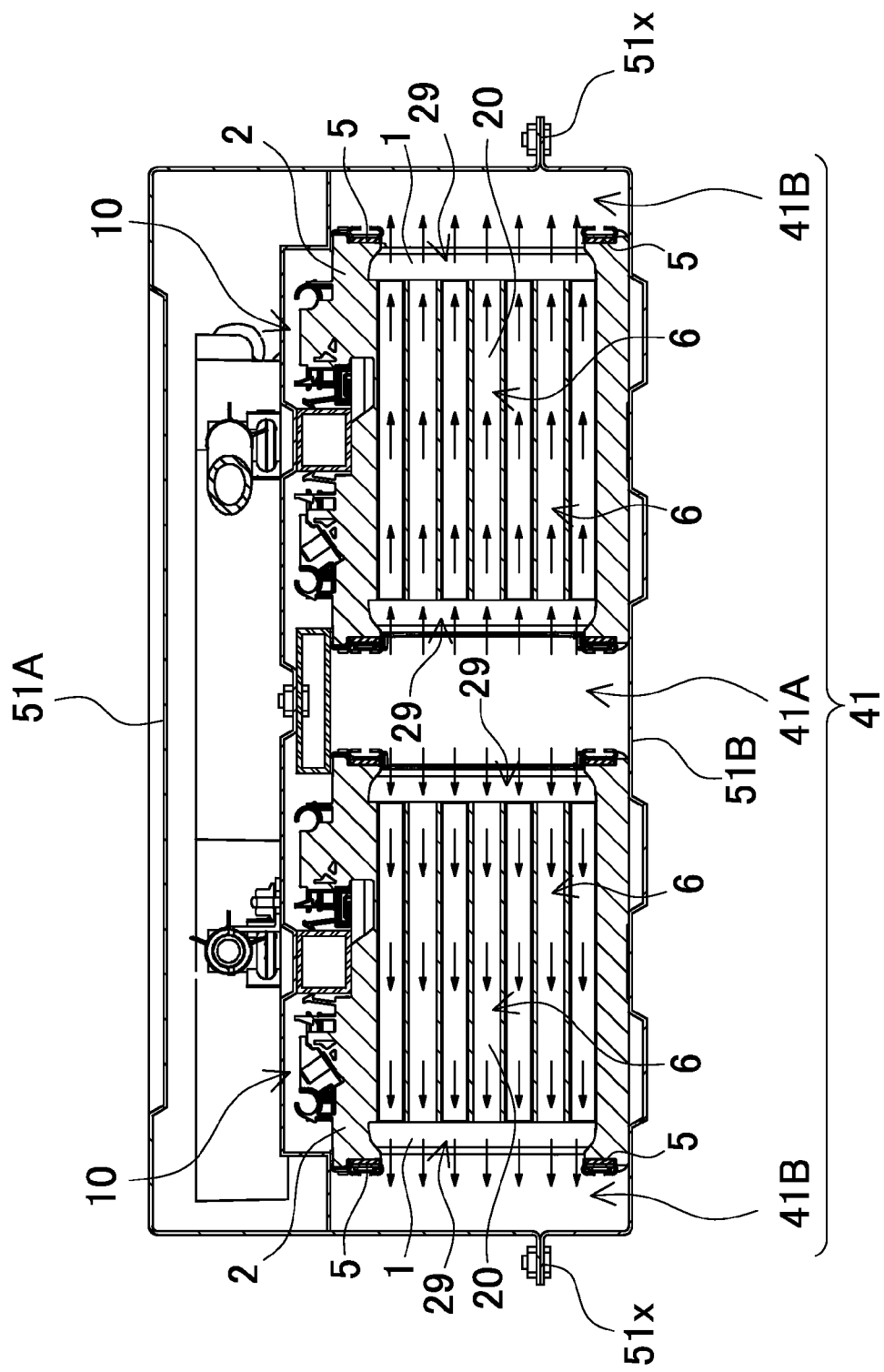
FIG. 17 is a vertical cross-sectional view showing the power supply device shown in FIG. 1.

As shown in FIGS. 14 to 16, the separator 2 has peripheral walls 22 that are arranged outside the interposed portion 20, and protrude in the side-by-side arrangement direction of the battery cells 1. The peripheral walls 22 of the separator 2 have substantially the same inner shape as the exterior shape of the battery cell 1. According to this construction, when the battery cells 1 are held in the peripheral walls 22, the separator 2 can be arranged in place. The peripheral walls 22 can hold the battery cells 1 by a fit-in structure. Specifically, the battery cells 1 are fitted in the peripheral walls 22 on the both surface sides of the separator 2. Thus, adjacent battery cells 1 are arranged side by side without positional deviation by the separator 2 that holds the battery cells 1 by using the fit-in structure. The peripheral wall 22 includes vertical, upper and bottom peripheral wall portions 22A, 22B and 22C. The vertical peripheral wall portions 22A can be located outside the both side surfaces of the battery cell 1. The upper peripheral wall portions 22B can be located outside the upper surface of the battery cell 1. The bottom peripheral wall portion 22C can be located outside the bottom surface of the battery cell 1.

The vertical peripheral wall portion does not continuously extend from the upper side end to the lower side end of the separator 2, but the vertical peripheral wall portions 22A are arranged on the upper and lower side end parts of the separator. Thus, an opening is formed between the upper and lower side end parts of the separator so that cooling gas can be forcedly blown to the space between the separator 2 and the battery cell 1. In the illustrated separator 2, the vertical peripheral wall portions 22A are arranged along the both side edges on the upper and lower parts (i.e., except the cutout-shaped areas) of the interposed plate portion 20, and integrally formed with the interposed plate portion 20. The vertical peripheral wall portion 22A that is arranged on the upper side end part of the separator 2 is coupled at a right angle to the upper peripheral wall portion 22B. The vertical peripheral wall portion 22A that is arranged on the lower side end part of the separator 2 is coupled at a right angle to the bottom peripheral wall portion 22C on the bottom surface side of the separator 2. The vertical peripheral wall portions 22A have a width that allows two separators to cover the overall width of the both side surfaces of one of the battery cells 1 when the separators are interposed between the battery cells 1. The protruding amount of the vertical peripheral wall 22A in the side-by-side arrangement direction of the battery cells 1 is a half the thickness of the battery cell 1 so that two vertical peripheral wall portions 22A can cover the overall width of the both side surfaces (i.e., the thickness) of the battery cell 1.

The vertical peripheral wall portions 22A cover the both side surfaces of the battery cell 1 so that this battery cell 1 is positioned in the horizontal orientation. The vertical peripheral wall portions 22A also serve as electrically insulating wall portions 30 that are arranged between the later-discussed bind bars 5 and the exterior surfaces of the battery cells 1, and electrically insulate the bind bars 5 and the battery cells 1 from each other. The bind bars 5 extend along the side surfaces of the battery assembly 9. The vertical peripheral wall portions 22A as the electrically insulating wall portions 30 are arranged between the exterior surfaces of the battery cells 1, and the bind bars 5. The vertical length of the vertical peripheral wall portion 22A as the electrically insulating wall portions 30 is equal to or longer than the width of the bind bar. The overall width of the bind bar 5 can be entirely electrically insulated by the electrically insulating wall portions 30 of the separators 2. Thus, the battery cells 1 can be ideally electrically insulated from the bind bars 5. However, it is not necessary that the vertical length of the electrically insulating wall portion be equal to or longer than the width of the bind bar. The reason is that, when the electrically insulating wall portion is arranged between the exterior surfaces of the battery cells and the bind bars, gaps can be formed between the exterior surfaces of the battery cells and the bind bars, and can electrically insulate the battery cells from the bind bars.

The thickness of the electrically insulating wall 30 of the separator 2 is small, preferably about 0.5 mm. This separator 2 can reduce the gap between the bind bar 5 and the battery cell 1 so that the surface of the battery cell 1 can be arranged close to the bind bar 5. In this case, the heat can be efficiently dissipated from the side surfaces of the battery cells 1 through the bind bars 5. In particular, in the case where the bind bar 5 is formed of a metal band having a large width, the heat can be more effectively dissipated. In the case where the electrically insulating wall portions 30 of the separator have a vertical length larger than the width of the bind bar 5, even when the electrically insulating wall portions are thin, the battery cells can be reliably electrically insulated from the bind bars. From this viewpoint, even when the thickness of the wide electrically insulating wall portions of this separator 2 is smaller than 0.5 mm, for example, not smaller than 0.3 mm and smaller than 0.5 mm, the battery cells can be electrically insulated from the bind bars. On the other hand, in the case where the electrically insulating wall portions are thick, for example, have a thickness in the range of 0.5 to 2 mm (preferably, 0.5 to 1 mm), even when the vertical length of the electrically insulating wall portions is smaller than the width of the bind bars, the battery cells can be electrically insulated from the bind bars. The reason is that the gaps between the exterior surfaces of the battery cells and the bind bars are large.

The upper peripheral wall portion 22B has a shape that does not overlap the output terminals 15 and an opening 12 of a safety valve that are arranged on the upper surface of the battery cell 1 whereby exposing the output terminals 15 and the opening 12 of the safety valve. In addition, the separator 2 shown in FIGS. 14 to 16 has a guide recessed portion 25 that is formed in the upper part of the separator 5 but on the lower side relative to the upper peripheral wall portion 22B. The guide recessed portion 25 accommodates a temperature sensor (not shown) that detects the cell temperature of the battery cell 1. This guide recessed portion 25 includes an insertion section 25A, and an accommodation section 25B. The insertion section 25A is opened upward in a direction diagonally intersecting with the upper edge of the separator 2. The accommodation section 25B communicates with the insertion section 25A, and extends in the horizontal direction. The temperature sensor is inserted through the insertion section 25A into the accommodation section 25B of the guide recessed portion 25 so that a temperature-detecting portion (not shown) is accommodated in the accommodation section 25B. Since the guide recessed portion 25 is located on the lower side relative to the upper peripheral wall portion 22B of the separator 2, the temperature-detecting portion of the temperature sensor is positioned at a predetermined depth from the upper surface of the battery cell 1 when accommodated in the accommodation section 25B. Since the accommodation section 25B extends in the horizontal direction, the temperature-detecting portion can be positioned at a constant depth from the upper surface of the battery cell 1 wherever the temperature-detecting portion is placed in the accommodation section 25B. According to this guide recessed portion 25, the temperature-detecting portions can be accurately positioned at the same depth from the upper surfaces of the battery cells 1.

As discussed above, the temperature-detecting portion of the temperature sensor is positioned lower than the upper surface of the battery cell 1 by the separator 2. However, the temperature-detecting portion of the temperature sensor may be positioned on the upper side relative to the upper surface of the battery cell by the guide recessed portion of the insertion section and the accommodation section. In this separator, the accommodation section can be located a position corresponding to the upper surface of the battery cell so that the temperature-detecting portion can be positioned on the upper surface of the battery cell when accommodated in the accommodation section.

Figure 13:
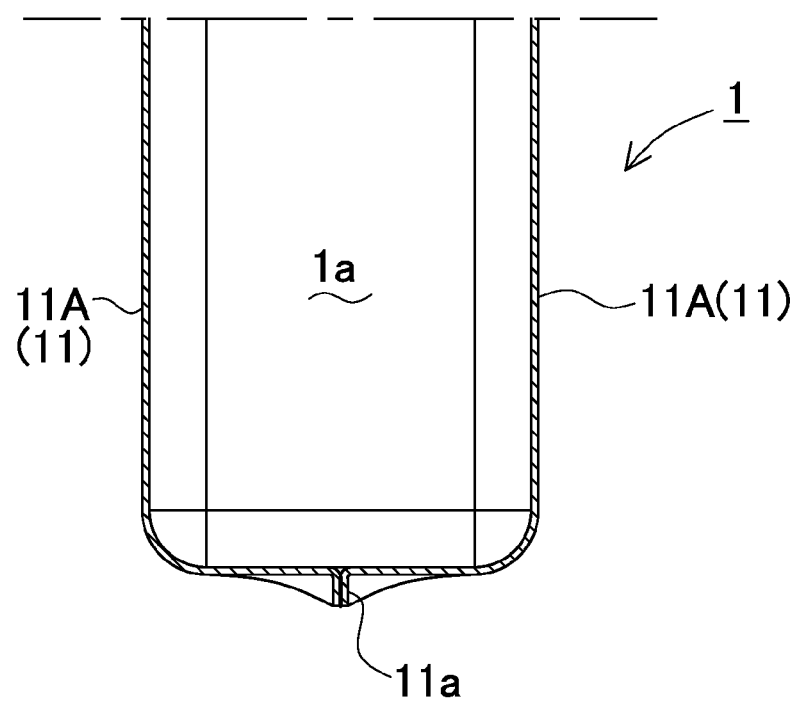
FIG. 13 is an enlarged view showing the bottom part of the battery cell covered with the heat contraction sheet.

The bottom peripheral wall portion 22C is located on the bottom surface side of the separator 2, and protrudes in the side-by-side arrangement direction of the battery cells 1, i.e., in the horizontal direction. Bottom surface openings 26 are formed between the bottom peripheral wall portions 22C of the separators 2 adjacent to each other. The bottom surface opening 26 accommodates the welded part 11a of the heat contraction sheet 11A, which covers the battery cell 1. In other words, when the battery cell 1 is sandwiched between these separators 2 adjacent to each other, the welded part 11a of the heat contraction sheet 11A, which protrudes from the bottom surface of the battery cell 1, is arranged in the bottom surface opening 26. In the separator 2 of the battery block 10 shown in FIGS. 4 and 14 to 16, the width of the bottom surface opening 26 gradually increases from the central part to the both sides. According to these separators 2, when the battery cell 1 is held in place inside the peripheral wall portions 22, the welded part 11a can be guided to the bottom surface opening 26. As a result, it is possible to prevent that the heat contraction sheet 11A is nipped by the separators 2. In particular, in the case where the battery cell 1 is covered by the heat contraction sheet 11A with the welded part 11a being formed on the bottom surface of the battery cell 1 as shown in FIG. 13, the width on the both sides of the welded part 11a is likely to be larger than in the central part. For this reason, in the case where the width of the bottom surface opening 26 between the separators 2 gradually increases from the central part to the both sides, this welded part 11a can be reliably guided to the bottom surface opening 26. As a result, it is possible to prevent that the heat contraction sheet 11A is nipped by the separators 2.

In addition, the separator 2 shown in FIGS. 8, 14, and 16 has stress-relief recessed portions 23 that are formed on both side parts of the interposed plate portion 20, which is sandwiched between the battery cells 1. These both side parts are parts that are opposed to a sealing portion on the upper side of the battery cells, and parts that are opposed to the bottom part on the lower side of the battery cells. The illustrated stress-relief recessed portions 23 are recessed parts that are formed on opposed parts of the interposed plate portion 20 opposed to the battery cells 1, and are grooves having a small depth. For example, the stress-relief recessed portion 23 can have a depth in the range of 0.1 to 2.0 mm, preferably 0.2 to 1.5 mm, in the case where the interposed plate portion of the separator 2 has a thickness of 2.3 mm. In the separator 2 shown in FIGS. 14 and 16, a plurality of stress-relief recessed portions 23 extend along the upper and lower edges of the battery cell 1, in other words, in the right-and-left direction in FIGS. 14 and 16. The partitioning wall portions 24 are arranged between the stress-relief recessed portions 23 adjacent to each other. The partitioning wall portion 24 has a height that allows the end surfaces of the partitioning wall portion 24 to contact the main surface 1A of the battery cell 1 so that the battery cell 1 opposed to the separator can be pressed and supported by the partitioning wall portions 24. In the illustrated separator 2, the stress-relief recessed portions 23 that extend along the upper edge of the battery cell 1 have a vertical length (x) of about 5 mm, and a depth of 1 mm, while the stress-relief recessed portions 23 that extend along the lower edge of the battery cell 1 have a vertical length (x) of about 6 mm, and a depth of 0.5 mm. However, it is noted that, for example, it is preferable that the width of the stress-relief recessed portion be not less than 2 mm, preferably not less than 3 mm, more preferably not less than 4 mm. Also, it is noted that, for example, it is preferable that the vertical length (x) of the stress-relief recessed portion 23 be not less than 20 mm, preferably not less than 15 mm, more preferably not less than 10 mm. In the illustrated separator 2, the stress-relief recessed portions 23 are formed on only one of the surface sides of the interposed plate portion 20. However, the separator can have the stress-relief recessed portions on both the surface sides of the interposed plate portion 20.

According to this separator, after the battery cells 1 are arranged between the interposed plate portions 20 of the separators 2 adjacent to each other so that the battery cells 1 and the separators 2 are alternately arranged side by side, when the battery cells 1 and the separators 2 are securely held from the both end surfaces of the battery assembly by the fastening members 3, it is possible to prevent that a stress is locally applied to the upper and lower parts of the battery cells 1. The reason is that, after the battery cells 1 are sandwiched the interposed plate portions 20 of the separators 2, when the battery assembly is pressed by the fastening members 3, the stress-relief recessed portions 23 in the interposed plate portion 20 prevent that a strong press force is applied to the surface of the battery cell 1 whereby avoiding that a stress is locally applied to the upper and lower parts of the battery cell 1. In particular, in the case where the stress-relief recessed portion 23 is formed in the upper end part of the interposed plate portion 20, it is possible to effectively prevent break and deformation of the edge of the upper part of the battery cell 1, in particular, break and deformation of the welding part between the sealing plate 1b and the exterior container 1a. In addition, in the case where the stress-relief recessed portion 23 is formed in the lower end part of the interposed plate portion 20, it is possible to prevent that a strong force is applied to a bottom surface part of the exterior container 1a of the battery cell 1 that is less likely to deform. Therefore, it is possible to protect the exterior container 1a of the battery cell 1, and additionally to surely hold the battery cell 1 between the interposed plate portions 20. On the other hand, the central part of the battery cell 1 is a flat surface part of the exterior container 1a, and is relatively elastic. For this reason, even when a press force is applied to this central part, this force may not immediately damage this central part. As a result, the separators can protect the upper and lower parts of the battery cell 1, and additionally can reliably hold the battery cell 1 between them.

The thus-constructed separators 2 are arranged side by side with being flipped from side to side as shown in FIG. 11 when the separators 2 are sandwiched between battery cells 1. In other words, the separator is orientated in a 180-degree turn from another separator adjacent to this separator. In the case where the separators 2 are arranged in the orientation, the battery cells 1 can be arranged side by side with being flipped from side to side so that the alternately arranged positive/negative output terminals can be connected to each other. Thus, the battery cells can be connected to each other in series.

(Battery Assembly)

The battery assembly 9 includes the battery cells 1 and the separators 2, which are alternately arranged side by side, as shown in FIGS. 6 and 7. In the battery assembly 9, the electrically insulating separators 2 are interposed between the battery cells 1 adjacent to each other so that the battery cells 1 and the separators 2 are arranged side by side. As a result, the adjacent battery cells 1 are electrically insulated from each other by the separators 2. When the separators 2 are interposed between the battery cells 1 adjacent to each other, the separator 2 is held by the battery cells 1 that are arranged on the both surface sides of this separator 2, while the battery cell 1 is held in place by the separators that are arranged adjacent to this battery cell 1. That is, the battery cell 1 is pressed from the both surface sides by the separators 2 that are arranged on the both surface sides of this battery cell 1. The battery cell 1 is pressed by the cell press portions 27 and also by the cell contact portions 28 of the separator 2 opposed to this battery cell 1. In the battery block 10 according to this embodiment shown in FIG. 7, the separators 2 adjacent to each other are flipped from side to side when being arranged side by side. Accordingly, when the battery cell 1 is sandwiched between two separators 2 that are arranged on the both surface sides of this battery cell, the cell press portions 27 of the interposed plate portion 20 of one of the two separators 2 are arranged at opposed positions on the both surface sides of this battery cell 1 opposed to the cell press portions 27 of the interposed plate portion 20 of the other of the two separators 2 as shown in FIG. 8. According to this construction, since these opposed positions on the both surface sides of the battery cell 1 are pressed by the cell press portions 27, and the battery cell 1 can be reliably held.

Figure 18:
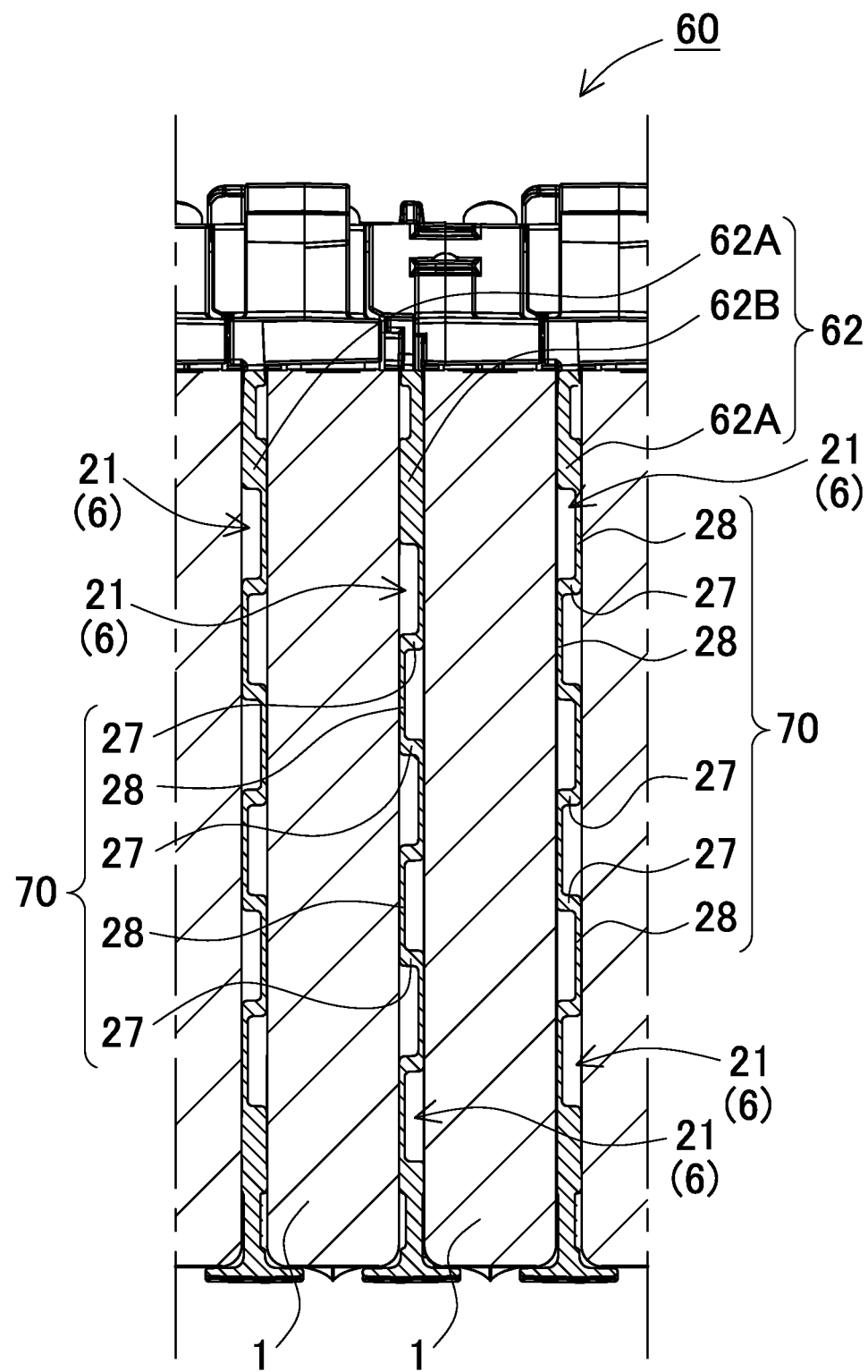
FIG. 18 is a partially enlarged cross-sectional view showing a battery pack according to another embodiment of the present invention.

However, as shown in a power supply device 60 of FIG. 18, the cell press portions 27 of interposed plate portions 70 of separators 62 that are arranged on the both surface sides of the battery cell 1 are arranged at positions on the both surface sides of this battery cell that are offset from each other. This battery block 60 includes two types of separators 62A and 62B as the separators 62, which include the interposed plate portions 70. The cell press portions 27 of the separator 62A are arranged at positions of the interposed plate portion 70 that are offset from the cell press portions 27 of the interposed plate portion 70 of the separator 62B. Accordingly, when the separators 62A and 62B are alternately arranged, and are interposed between the battery cells 1, the cell press portions 27 of the separator 62A are arranged at positions that are offset from the cell press portions 27 of the separator 62B. According to this construction, it is possible to avoid that the same part of the exterior container 1a of the battery cell 1 is pressed by strong forces from both surface sides. Thus, a pressed part can be deviated or deformed. Therefore, it is possible suppress that a too much load is applied to the current collector, which is accommodated in the battery cell 1.

(Fastening Member 3)

As shown in FIGS. 3 to 6, the battery assembly 9 of the battery cells 1 and the separators 2, which are arranged side by side, is securely held by the fastening members 3. The fastening members 3 include end plates 4, and the bind bars 5. The end plates are arranged on the both end surfaces of the battery assembly 9. The ends of the bind bars 5 are coupled to the end plates 4 so that the battery cells 1 are arranged side by side and pressed from the both end surface sides of the battery assembly. When the bind bars 5 are coupled to a pair of end plates 4, which are arranged on the both end surfaces of the battery assembly 9, the battery cells 1, which are arranged side by side, are pressed in a direction perpendicular to the main surface of the battery cell so that the battery assembly is securely held by the fastening members.

(End Plate 4)

After the battery cells 1 and the separators 2 of the battery assembly 9 are alternately arranged side by side, as shown in FIGS. 3 to 6, the battery assembly 9 is securely held with the end plates 4 biasing the separators 2 that are located on the both end surfaces of the battery assembly 9. The end plate 4 is formed of hard plastic or metal such as aluminum or aluminum alloy. The end plate 4 has substantially the same exterior rectangular shape as the rectangular battery 1 so that the contact area of the end plate 3 with the battery cell 1 can be large. The rectangular end plate 4 has the same size as the rectangular battery 1, or a slightly larger size than the rectangular battery 1. In the case where the end plate is formed of plastic, the end plate 4 is directly fastened to the rectangular battery 1. In the case where the end plate is formed of metal, the end plate 4 is fastened to the battery cell 1 with an electrically insulating member being interposed between the end plate and rectangular battery.

(Bind Bar 5)

The ends of the bind bars 5 are coupled to the end plates 4. The bind bars 5 are coupled to the end plates 4 by fastening screws 19. Although the bind bars 5 shown in FIGS. 3 to 6 are coupled to the end plates 4 by fastening screws 19, the bind bars may be coupled to the end plates by bending the ends of the bind bars inward or by caulking the ends of the bind bar.

The bind bars 5 can be formed by the working of a metal plate having a predetermined thickness into a metal band having a predetermined width. The ends of the bind bars 5 are coupled to the end plates 4. Thus, the pair of end plates 4 are coupled to each other through the bind bars 5 so that the battery cells 1 are held and pressed. The pair of end plates 4 are fixed at a predetermined interval away from each other by the bind bars 5 so that the battery cells 1, which are arranged side by side between the end plates 4, are held in a predetermined pressure state. If the bind bars 5 expand when the expansion pressure of the battery cell 1 is applied to the bind bars, the bind bars cannot prevent expansion of the battery cell 1. For this reason, the bind bars 5 are formed by the working of a metal plate that has sufficient stiffness to prevent expansion when the expansion pressure of the battery cell 1 is applied, for example, a metal plate of stainless plate such as SUS304 or a steel plate, into a metal band having a width and a thickness that can provide sufficient stiffness. Alternately, the bind bars may be formed the working of a metal plate into a metal band having an gas-flowing groove shape. Since the thus-shaped bind bars can have a high stiffness against bending, even in the case where the width of the bind bars is small, the battery cells can be arranged side by side and securely held in the predetermined pressure state. The bind bar 5 includes bent parts 5A that are arranged on the ends of the bind bar. The bent parts 5A are coupled to the end plates 4. The bent part 5A has a through hole for receiving the fastening screw 19. The fastening screws 19 are inserted into the through holes, and screwed to the end plates 4 so that the bind bar is fastened to the endplates.

(End Separator 2')

In addition, the battery block 10 shown in FIG. 6 includes end separators 2'. The end separator 2' is interposed between the end plate 4 and the battery cell 1 that is arranged on each of the both end surfaces of the battery assembly 9. The end separators 2' are electrically insulative. According to this construction, the electrically insulating end separator 2' can electrically insulate the battery cell 1, which includes the metal exterior container 1*a*, from the metal end plate 4. As a result, it is possible to reliably electrically insulate the battery cells 1, which are arranged side by side, from each other. Therefore, it is possible to provide a more reliable power supply device. Similar to the aforementioned separator 2, the end separator 2' can have recessed parts that form the gas-flowing paths 6 between the battery cell 1 and the end plate so that cooling gas can flow along surfaces of this battery cell 1, which is opposed to this end separator 2'. That is, the end separator 2' can have the gas-flowing grooves 21 that are formed on a surface that opposed to the battery cell 1 and extend from one side to the other side of the separator 2 so that the gas-flowing paths 6 can be formed between the main surface 1A of this battery cell 1 and the end separator 2'.

(Bus Bar)

After the battery cells 1 are arranged side by side so that the battery assembly 9 is constructed, the positive/negative output terminals 15 of the battery cells 1 are connected to each other so that the battery cells 1 are connected in series and/or in parallel to each other. In the battery assembly 9, the positive and negative out terminals 15 of adjacent battery cells 1 are connected in series and/or in parallel to each other by bus bars (not shown). In the case where the rechargeable battery cells of the battery assembly adjacent to each other are connected in series to each other, the output voltage of the battery assembly can be high. In the case where the rechargeable battery cells of the battery assembly adjacent to each other are connected in parallel to each other, the charging/discharging current of the battery assembly can be high.

The fastening screw 15A as the output terminal 15 is inserted into the bus bar. A nut is threadedly engaged with the fastening screw 15A. Thus, the bus bar is fastened to the output terminal 15. The bus bar is a metal plate that has through holes on the both end parts of the bus bar. The through holes receive the fastening screws 15A as the output terminals 15 of the battery cells 1 adjacent to each other. The bus bar is arranged on the connection leads 14 with the output terminals 15 passing through this bus bar. The bus bar electrically connects the output terminals 15 of the adjacent battery cells 1 to each other. The connection pattern between the output terminals of the adjacent battery cells 1 depends on serial connection or parallel connection. That is, in the case of serial connection, the positive terminal of one of the adjacent battery cells is connected to the negative terminal of the other of the adjacent battery cells. In the case of parallel connection, the positive and negative terminals of one of the adjacent battery cells are connected to the positive and negative terminals of the other of the adjacent battery cells, respectively. In the case of the power supply device in which the battery cells 1 are serially connected to each other, the output voltage of the battery pack can be high. Note that, in the power supply device according to the present invention, battery cells adjacent to each other may be connected in parallel to each other so that the current capacity of the power supply device can be high.

(Air Duct)

Figure 19:
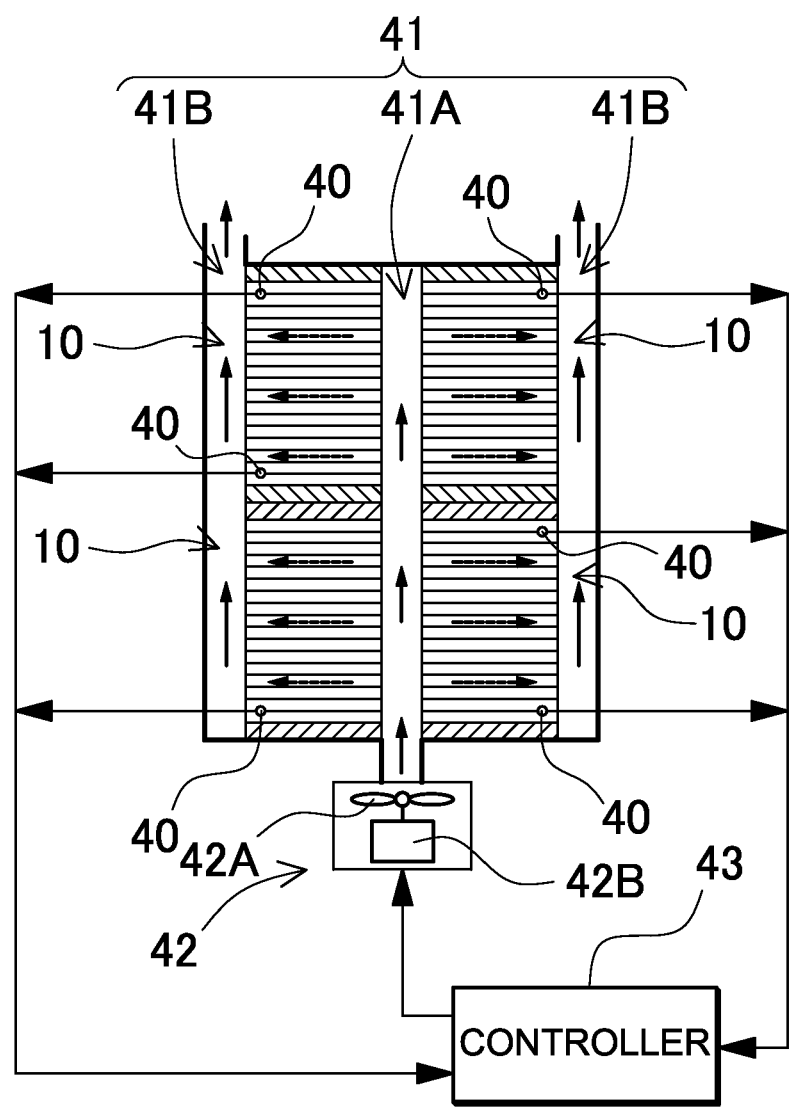
FIG. 19 is a schematic view showing a system for cooling the battery blocks by using cooling gas.

In order to forcedly blow cooling gas through the gas-flowing paths 6, which are formed between the battery cells 1 and the separators 2, as shown in FIGS. 17 and 19, the power supply device includes a set of gas-flowing ducts 41, and a forcedly-gas-blowing mechanism 42. The gas-flowing duct 41 are formed on the both right and left sides of the battery block 10. The forcedly-gas-blowing mechanism 42 is connected to the gas-flowing ducts 41. In this power supply device, cooling gas is forcedly blown, and passes through the gas-flowing paths 6 from one of the gas-flowing ducts 41 so that the battery cells 1 can be cooled. Also, in this power supply device, warm gas may be forcedly blown, and passes through the gas-flowing paths 6 from one of the gas-flowing ducts 41 so that the battery cells 1 may be warmed.

The gas-flowing ducts 41 include inlet and outlet ducts 41A and 41B. The inlet and outlet ducts 41A and 41B are arranged on the both sides of the battery block. Cooling gas flows from the inlet duct 41A into the gas-flowing paths 6, and is discharged through the outlet ducts 41B so that the battery cells 1 can be cooled. The gas-flowing paths 6 are connected in parallel to each other between the inlet duct 41A and the outlet duct 41B. Accordingly, after flowing into the inlet duct 41A, cooling gas is branched and flows into the gas-flowing paths 6 so that the cooling gas flows from the inlet duct 41A to the outlet duct 41B. In the power supply device shown in FIGS. 17 and 19, since the inlet duct 41A and the outlet duct 41B are formed on the both sides of the battery block 10, the gas-flowing paths 6 extend in the horizontal direction. The cooling gas flows through the gas-flowing paths 6 in the horizontal direction, and can cool the battery cells 1. However, the power supply device may have the gas-flowing paths that extend in the vertical direction, and a pair of gas-flowing ducts that are formed on the opposed, upper and lower surfaces of the power supply device.

(Forcedly-Gas-Blowing Mechanism 42)

The forcedly-gas-blowing mechanism 42 shown in FIG. 19 includes a fan 42A that is rotated by an electric motor 42B. The fan 42A is connected to the gas-flowing ducts 41. In the power supply device, the forcedly-gas-blowing mechanism 42 is connected to the inlet duct 41A so that cooling gas is forcedly blown into the inlet duct 41A by the forcedly-gas-blowing mechanism 42, for example. In this power supply device, cooling gas flows from the forcedly-gas-blowing mechanism 42 through the inlet duct 41A, and the gas-flowing paths 6, to the outlet ducts 41B so that the battery cells 1 can be cooled. It is noted that the forcedly-gas-blowing mechanism may be connected to the outlet duct. In this case, cooling gas can be forcedly drawn from the outlet duct by the forcedly-gas-blowing mechanism, and is exhausted. Thus, in this power supply device, cooling gas can flow from the inlet ducts, through the gas-flowing paths, and the outlet duct to the forcedly-gas-blowing mechanism so that the battery cells can be cooled. The cooling gas to be blown is air. However, instead of air, the cooling gas may be inert gases such as nitrogen and the carbon dioxide. In the case where the power supply device uses inert gas as the cooling gas, the cooling gas circulates through the gas-flowing paths, ducts and the like so that the battery cell can be cooled. The circulating inert gas is cooled by a heat exchanger for cooling the inert gas that is connected to a certain point of the circulation path. The circulating inert gas circulates through the inlet duct, the gas-flowing paths, the outlet duct, and the forcedly-gas-blowing mechanism so that the battery cell can be cooled.

(Control Circuit 43, and Temperature Sensor 40)

A control circuit 43 controls operation of the electric motor 42B, which rotates the fan 42A. The control circuit 43 controls operation of the electric motor 42B of the forcedly-gas-blowing mechanism 42 in accordance with the signals from temperature sensors 40. In the battery block 10, the temperature sensors 40 are thermally connected to some of the battery cells 1. The temperature of the entire battery block 10 is estimated based on the temperatures of these battery cells 1 that are detected by the temperature sensor 40. The control circuit 43 controls cooling operation or charging/discharging current in accordance with the temperature of the battery block 10. When the highest temperature of the temperatures detected by the temperature sensors 40 becomes higher than a predetermined temperature, the control circuit 43 activates the electric motor 42B of the forcedly-gas-blowing mechanism 42 so that cooling gas is forcedly blown through the gas-flowing paths. When the highest temperature becomes lower than the predetermined temperature, the electric motor 42B is deactivated. The control circuit 43 can control the electric power supplied to the electric motor 42B in accordance with the temperatures detected by the temperature sensors 40 so that the temperatures of the battery cells 1 can be adjusted within a predetermined range. For example, when the temperatures detected by the temperature sensors 40 rise, electric power supplied to the electric motor 42B can be gradually increased so that the gas-flowing amount of the forcedly-gas-blowing mechanism 42 can be increased, while when the detected temperatures decreases, electric power supplied to the electric motor 42B can be reduced. Thus, the temperatures of the battery cells 1 can be adjusted within a predetermined range.

Although not illustrated, the cooling plate can be fastened onto and thermally connected to the lower surface of the battery block of the power supply device so that the battery cells can be cooled through the bottom surfaces of the battery cells by the cooling plate. It is not necessary for the power supply device to forcedly blow cooling gas for cooling the battery cells to the gas-flowing paths, which are formed in the battery block. Air can be flown by natural convection through the gas-flowing paths, which are formed between the battery cells and the separators.

The aforementioned power supply devices can be used as a battery system for vehicles. The power supply device can be installed on electric vehicles such as hybrid cars that are driven by both an engine and a motor, and electric vehicles that are driven only by a motor. The power supply device can be used as a power supply device for these types of vehicles.

(Hybrid Car Power Supply Device)

Figure 20:
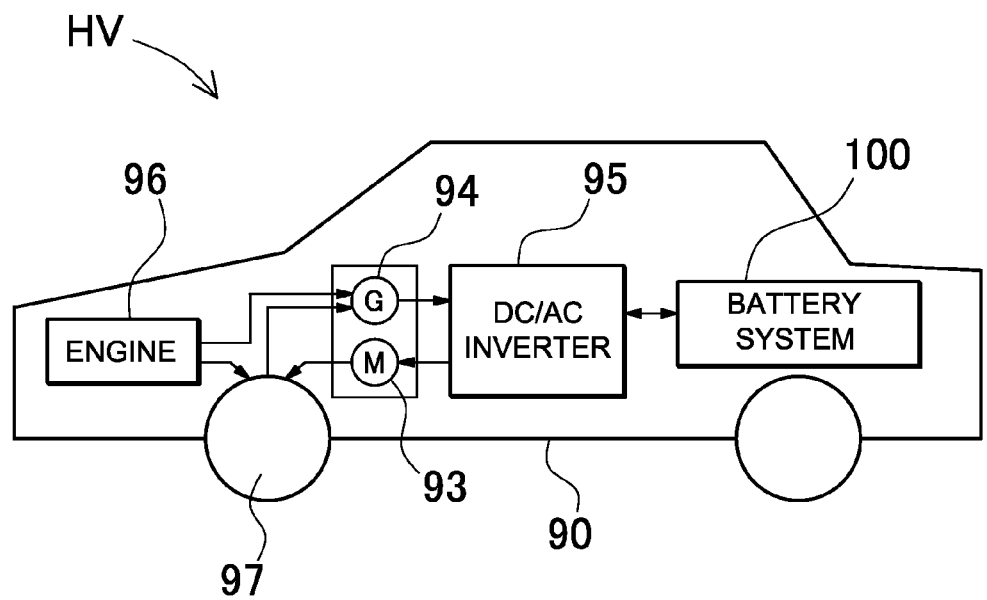
FIG. 20 is a block diagram showing an exemplary hybrid car that is driven by an internal-combustion engine and an electric motor, and includes the power supply device.

FIG. 20 is a block diagram showing an exemplary hybrid car that is driven both by an engine and an electric motor, and includes the power supply device. The illustrated vehicle HV including the power supply device includes an electric motor 93, an internal-combustion engine 96, the power supply device 100, an electric generator 94, a vehicle body 90, and wheels 97. The electric motor 93 and the internal-combustion engine 96 drive the vehicle HV. The power supply device 100 supplies electric power to the electric motor 93. The electric generator 94 charges battery cells of the power supply device 100. The vehicle body 90 accommodates the internal-combustion engine 96, the electric motor 93, the power supply device 100, and the electric generator 94. The wheels 97 are driven for vehicle body 90 travelling by the internal-combustion engine 96 or the electric motor 93. The power supply device 100 is connected to the electric motor 93 and the electric generator 94 via a DC/AC inverter 95. The vehicle HV is driven both by the electric motor 93 and the internal-combustion engine 96 with the battery cells of the power supply device 100 being charged/discharged. The electric motor 93 is energized with electric power and drives the vehicle in a poor engine efficiency range, e.g., in acceleration or in a low speed range. The electric motor 93 is energized by electric power that is supplied from the power supply device 100. The electric generator 94 is driven by the engine 96 or by regenerative braking when users brake the vehicle so that the battery cells of the power supply device 100 are charged.

(Electric Vehicle Power Supply Device)

Figure 21:
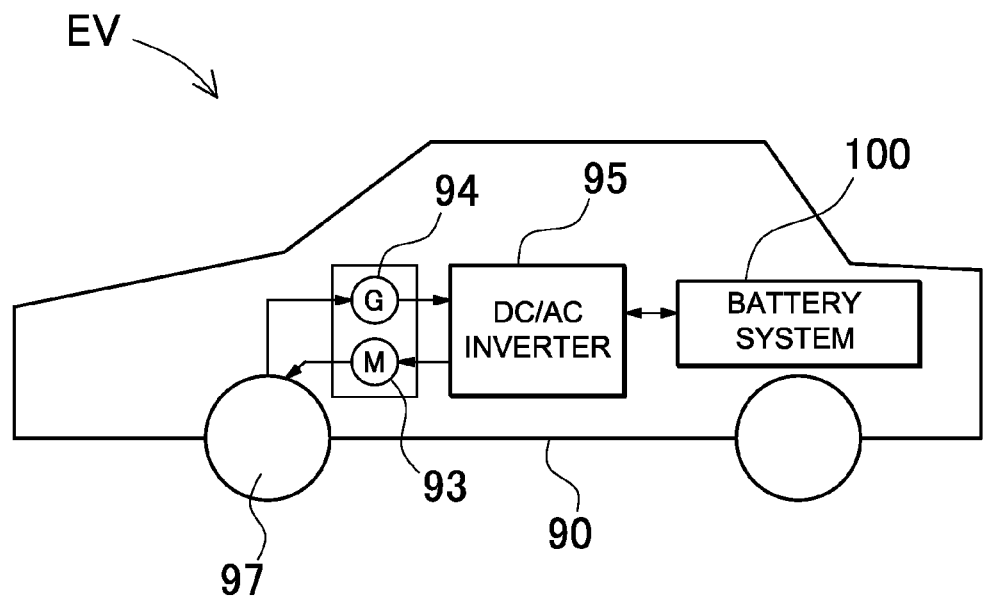
FIG. 21 is a block diagram showing an exemplary electric vehicle that is driven only by an electric motor, and includes the power supply device.

FIG. 21 shows an exemplary electric vehicle that is driven only by an electric motor, and includes the power supply device. The illustrated vehicle EV including the power supply device includes the electric motor 93, the power supply device 100, the electric generator 94, the vehicle body 90, and wheels 97. The electric motor 93 drives the vehicle EV. The power supply device 100 supplies electric power to the electric motor 93. The electric generator 94 charges battery cells of the power supply device 100. The vehicle body 90 accommodates the electric motor 93, the power supply device 100, and the electric generator 94. The wheels 97 are driven for vehicle body 90 travelling by the electric motor 93. The power supply device 100 is connected to the electric motor 93 and the electric generator 94 via a DC/AC inverter 95. The electric motor 93 is energized by electric power that is supplied from the power supply device 100. The electric generator 94 can be driven by vehicle EV regenerative braking so that the battery cells 20 of the power supply device 100 are charged.

(Power Storage Type Power Supply Device)

Figure 22:
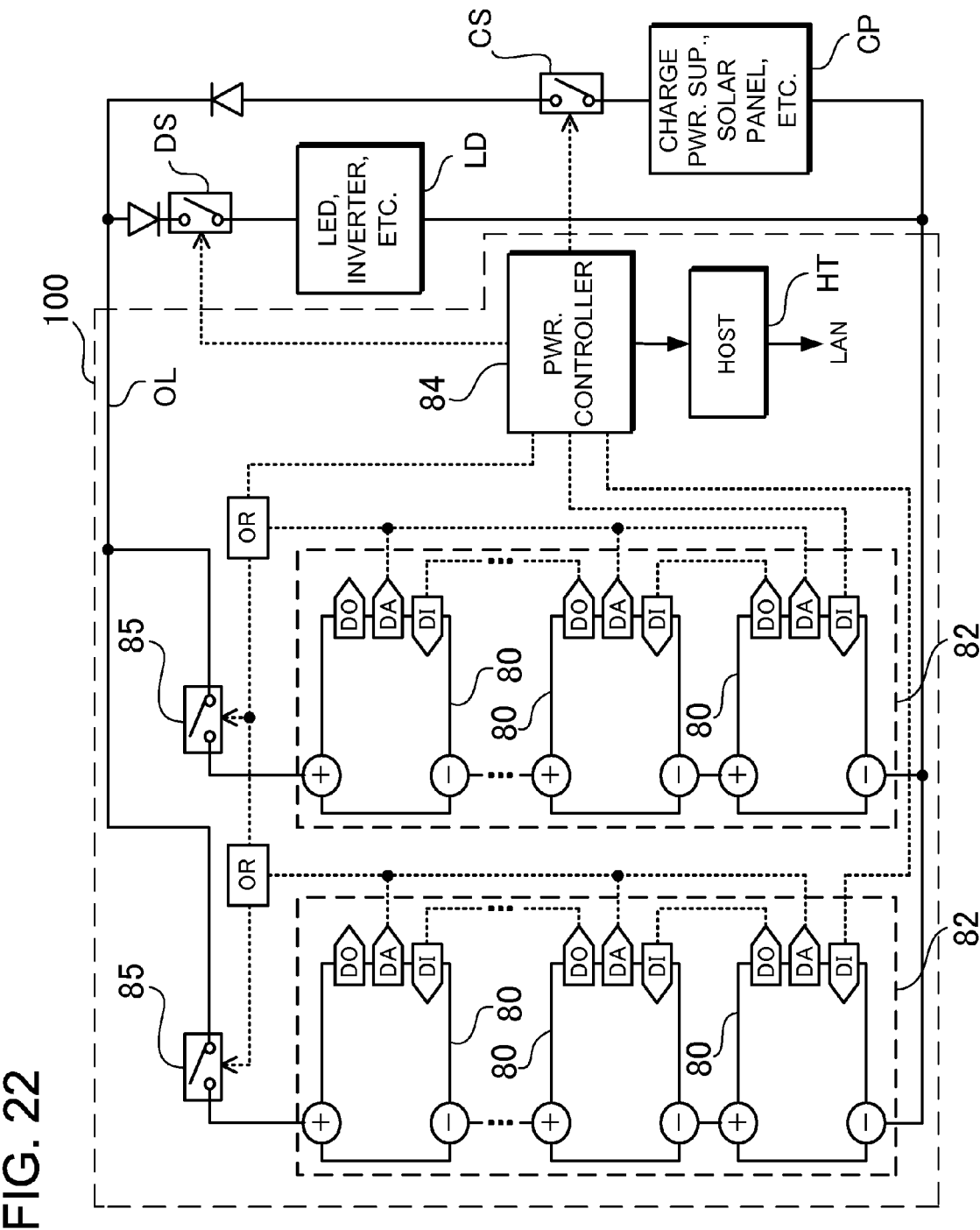
FIG. 22 is a block diagram a power storage type power supply device to which the present invention is applied.
Figure 23:
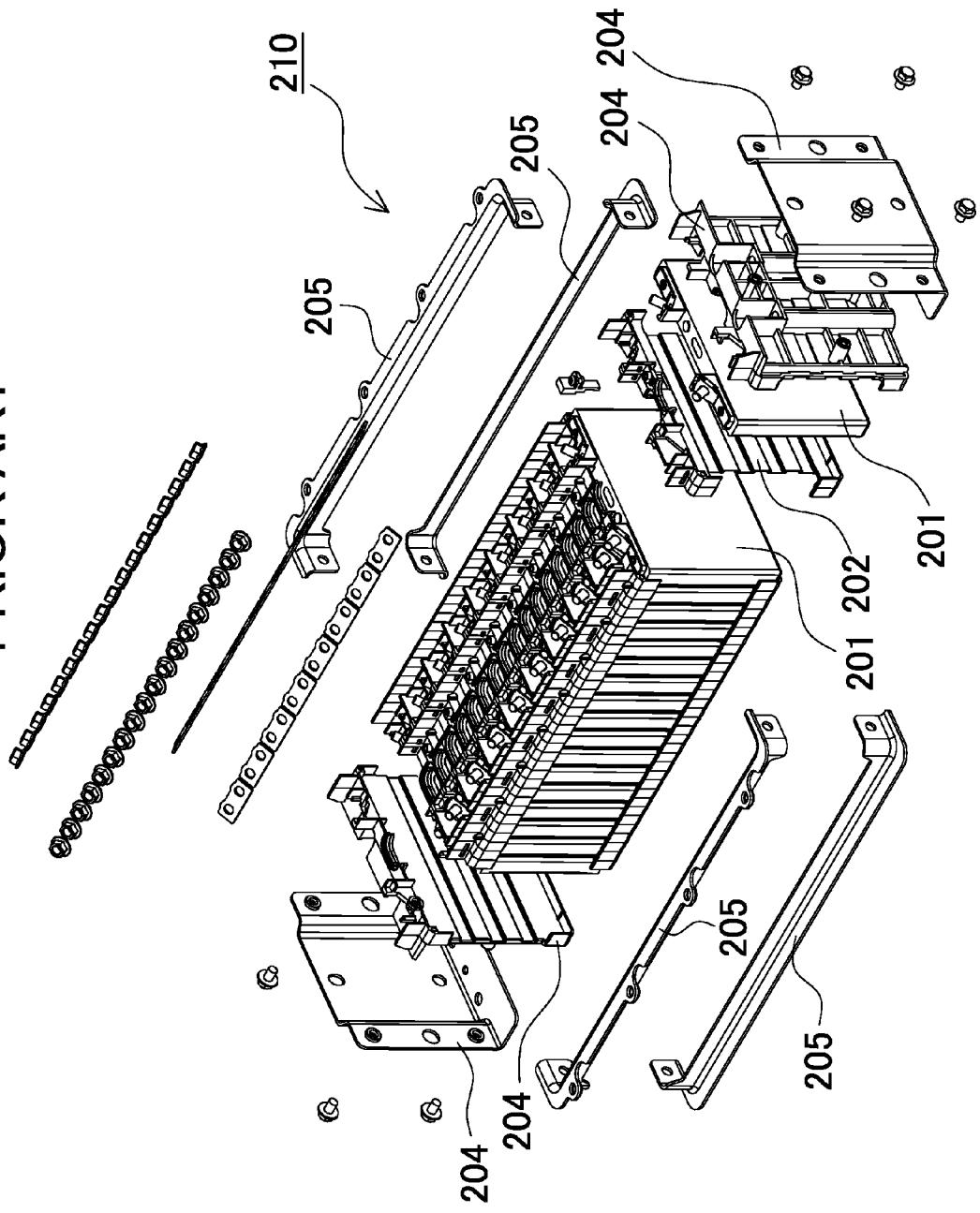
FIG. 23 is an exploded perspective view showing a battery block included in a known power supply device.
Figure 24:
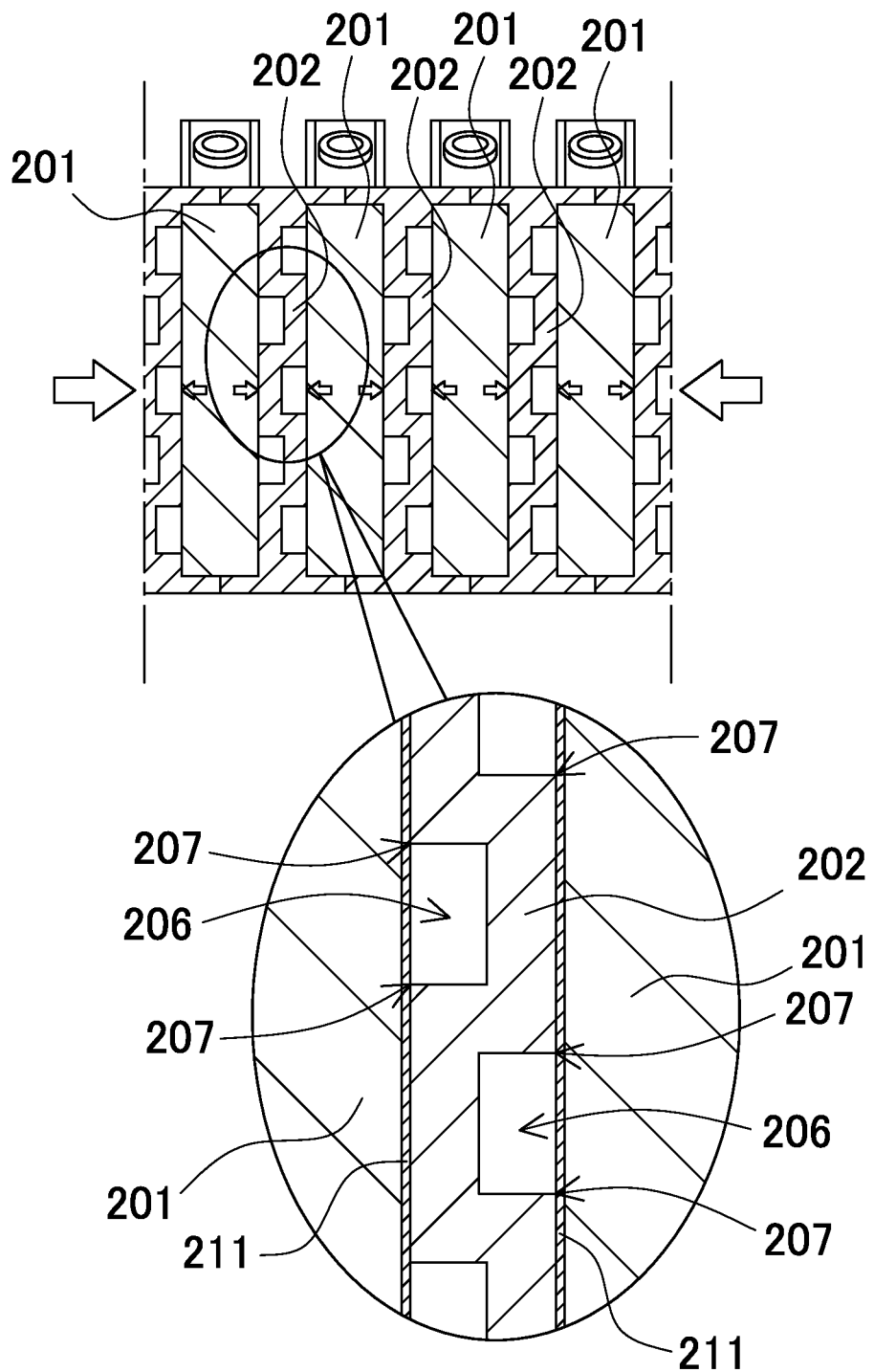
FIG. 24 is a partially enlarged, cross-sectional schematic view showing the side-by-side arrangement in the battery block shown in FIG. 23.

The power supply device can be used not only as power supply of mobile unit but also as stationary power storage. For example, examples of stationary power storage devices can be provided by an electric power system for home use or plant use that is charged with sunlight or with midnight electric power and is discharged when necessary, a power supply for street lights that is charged with sunlight during the daytime and is discharged during the nighttime, or a backup power supply for signal lights that drives signal lights in the event of a power failure. FIG. 22 shows an exemplary circuit diagram. This illustrated power supply device 100 includes battery units 82 each of which includes a plurality of battery blocks 80 that are connected to each other. In each of battery blocks 80, a plurality of battery cells 1 are connected to each other in serial and/or in parallel. The battery blocks 80 are controlled by a power supply controller 84. In this power supply device 100, after the battery units 82 are charged by a charging power supply CP, the power supply device 100 drives a load LD. The power supply device 100 has a charging mode and a discharging mode. The Load LD and the charging power supply CP are connected to the power supply device 100 through a discharging switch DS and a charging switch CS, respectively. The discharging switch DS and the charging operation switch CS are turned ON/OFF by the power supply controller 84 of the power supply device 100. In the charging mode, the power supply controller 84 turns the charging operation switch CS ON, and turns the discharging switch DS OFF so that the power supply device 100 can be charged by the charging power supply CP. When the charging operation is completed so that the battery units are fully charged or when the battery units are charged to a capacity not lower than a predetermined value, if the load LD requests electric power, the power supply controller 84 turns the charging operation switch CS OFF, and turns the discharging switch DS ON. Thus, operation is switched from the charging mode to the discharging mode so that the power supply device 100 can be discharged to supply power to the load LD. In addition, if necessary, the charging operation switch CS may be turned ON, while the discharging switch DS may be turned ON so that the load LD can be supplied with electric power while the power supply device 100 can be charged.

The load LD driven by the power supply device 100 is connected to the power supply device 100 through the discharging switch DS. In the discharging mode of the power supply device 100, the power supply controller 84 turns the discharging switch DS ON so that the power supply device 100 is connected to the load LD. Thus, the load LD is driven with electric power from the power supply device 100. Switching elements such as FET can be used as the discharging switch DS. The discharging switch DS is turned ON/OFF by the power supply controller 84 of the power supply device 100. The power supply controller 84 includes a communication interface for communicating with an external device. In the exemplary power supply device shown in FIG. 22, the power supply controller is connected to a host device HT based on existing communications protocols such as UART and RS-232C. Also, the power supply device may include a user interface that allows users to operate the electric power system if necessary.

Each of the battery blocks 80 includes signal terminals and power supply terminals. The signal terminals include an input/output terminal DI, an abnormality output terminal DA, and a connection terminal DO. The block input/output terminal DI serves as a terminal for providing/receiving signals to/from other battery blocks 80 and the power supply controller 84. The block connection terminal DO serves as a terminal for providing/receiving signals to/from other battery blocks 80. The abnormality output terminal DA serves as a terminal for providing an abnormality signal of the battery block 80 to the outside. Also, the power supply terminal is a terminal for connecting one of the battery blocks 80 to another battery blocks in series or in parallel. In addition, the battery units 82 are connected to an output line OL through parallel connection switches 85, and are connected in parallel to each other.

INDUSTRIAL APPLICABILITY

A power supply device according to the present invention can be suitably applied to power supple devices of plug-in hybrid vehicles and hybrid electric vehicles that can switch between the EV drive mode and the HEV drive mode, electric vehicles, and the like. Also, a power supply device according to the present invention can be suitably used as backup power supply devices that can be installed on a rack of a computer server, backup power supply devices for wireless communication base stations, electric power storages for home use or plant use, electric power storage devices such as electric power storages for street lights connected to solar cells, backup power supplies for signal lights, and the like.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims.

What is claimed is:

1. A power supply device comprising:
a plurality of battery cells that each have a rectangular-box exterior shape, wherein the battery cell are arranged side by side;
a plurality of separators interposed between the plurality of battery cells;
a fastening member that securely holds a battery assembly formed by the plurality of battery cells and the separators, which are alternately arranged side by side; and
electrically insulating sheets that cover surfaces of the battery cells, respectively,
wherein edge parts of each of the recessed parts are rounded,
wherein each of the separators includes:
an interposed plate portion sandwiched between adjacent battery cells and contacting the adjacent electrically insulating sheets, and
a bottom peripheral wall portion formed at a bottom end of the interposed plate portion and protruding in a stacking direction of the battery cells,
wherein the interposed plate portion includes:
recessed parts that form a plurality of gas-flowing paths between the adjacent battery cells so that cooling gas can flow along surfaces of the battery cells, each of the separators has a bottom recessed part positioned closest to the bottom peripheral wall portion; and
at least a first groove formed in a surface of the interposed plate portion and positioned between the bottom recessed part and the bottom peripheral wall portion, and
wherein a depth of the first groove is smaller in the stacking direction of the battery cells than a depth of each of the recessed parts.

2. The power supply device according to claim 1, wherein each of the separators has a plurality of gas-flowing grooves forming the gas-flowing paths, which are formed on an opposed surface of the separator opposed to the battery cell and extend from one side to the other side of the respective, so that the gas-flowing paths are formed between a main surface of the battery cell and the separator,
wherein the edge parts are opening edges that extend along the extension direction of the gas-flowing grooves and are in contact with the main surface of the battery cell.

3. The power supply device according to claim 1, wherein a plurality of gas-flowing grooves as said gas-flowing paths are alternately open on both surface sides of the interposed plate portion, and extend from one side to the other side of the interposed plate portion, wherein the gas-flowing paths are formed between the gas-flowing grooves and main surfaces of opposed battery cells that are opposed to the gas-flowing grooves so that the gas-flowing paths are formed on both sides of the interposed plate portion.

4. The power supply device according to claim 3, wherein the interposed plate portion includes a plurality of cell press portions sandwiched between the battery cells that are adjacent to each other when the battery assembly is securely held, and a plurality of cell contact portions in contact with the main surfaces of the opposed battery cells,
wherein the cell press portions form side walls of the gas-flowing grooves, and the cell contact portions form the bottom surfaces of the gas-flowing grooves.

5. A vehicle comprising the power supply device according to claim 1, wherein the vehicle further comprising:
a driving electric motor that is supplied with the electric power from the power supply device;

a vehicle body that accommodates the power supply device and the electric motor; and wheels that are driven by the electric motor for vehicle traveling.

6. The power supply device according to claim 1, wherein the interposed plate portion includes a plurality of the first grooves, and the first grooves are aligned along an extending direction of the gas-flowing paths.

7. The power supply device according to claim 1, wherein the interposed plate portion includes a plurality of the first grooves which are different in shape, and the first grooves are aligned along an extending direction of the gas-flowing paths.

8. The power supply device according to claim 1, wherein the interposed plate portion includes a plurality of the first grooves, and the separator has at least a partitioning wall portion, the partitioning wall portion being positioned between the first grooves that are adjacent to each other.

9. The power supply device according to claim 1, wherein a vertical length of the first groove is smaller than a vertical length of each of the recessed parts.

10. The power supply device according to claim 1, wherein:
each of the separators has an upper peripheral wall portion that is formed at an upper end of the interposed plate portion and protrudes in a stacking direction of the battery cells,
the interposed plate portion includes an uppermost recessed part that is positioned the closest to the upper peripheral wall portion, and at least a second groove that is positioned between the uppermost recessed part and the upper peripheral wall portion, and
a depth of the second groove is smaller in the stacking direction of the battery cells than a depth of each of the recessed parts.

11. The power supply device according to claim 1, wherein the separator has partitioning wall portions formed at both sides of the first groove in an extending direction of the gas-flowing paths.

12. The power supply device according to claim 1, wherein a length of the bottom peripheral wall portion is longer, in the extending direction of the gas-flowing paths, than a length of the first groove.

13. The power supply device according to claim 12, wherein the interposed plate portion includes a plurality of the first grooves, and the first grooves are aligned along the extending direction of the gas-flowing paths.

14. The power supply device according to claim 12, wherein the interposed plate portion includes a plurality of the first grooves, and at least a partitioning wall portion positioned between the first grooves that are adjacent to each other.

15. The power supply device according to claim 12, wherein a vertical length of the first groove is smaller than a vertical length of each of the recessed parts.

16. The power supply device according to claim 12, wherein:
the separator has an upper peripheral wall portion that is formed at an upper end of the interposed plate portion and protrudes in a stacking direction of the battery cells;
the interposed plate portion includes an uppermost recessed part that is positioned closest to the upper peripheral wall portion, and at least a second groove that is positioned between the upper recessed part and the upper peripheral wall portion; and a depth of the second groove is smaller in the stacking direction of the battery cells than a depth of each of the recessed parts.

17. The power supply device according to claim 12, wherein:
the interposed plate portion includes a plurality of the first grooves, and the first grooves are aligned along an extending direction of the gas-flowing paths; and
the separator has partitioning wall portions that are formed at both sides of the first groove in an extending direction of the gas-flowing paths.

18. A power supply device comprising:
a plurality of battery cells, each of the battery cells having a rectangular-box exterior shape;
a plurality of separators interposed between the plurality of battery cells, which are arranged side by side;
a fastening member securely holding a battery assembly formed by the plurality of battery cells and the separators, which are alternately arranged side by side; and
electrically insulating sheets covering surfaces of the battery cells, respectively,
wherein each of the separators has recessed parts that form a plurality of gas-flowing paths between adjacent battery cells so that cooling gas can flow along surfaces of the battery cells,
wherein edge parts of each of the recessed parts are rounded,
wherein each of the separators includes:
an interposed plate portion that is sandwiched adjacent battery cells and contacts the electrically insulating sheets; and
a bottom peripheral wall portion that is formed at a bottom end of the interposed plate portion and protrudes in a stacking direction of the battery cells,
wherein the interposed plate portion includes the recessed parts, and a bottommost one of the recessed parts is positioned the closest to the bottom peripheral wall portion,
wherein the interposed plate portion includes at least a first groove that is positioned between the bottommost recessed part and the bottom peripheral wall portion,
wherein a vertical length of the first groove is smaller than a vertical length of each of the recessed parts,
wherein the interposed plate portion includes a plurality of the first grooves, and the first grooves are aligned along an extending direction of the gas-flowing paths, and
wherein a length of the bottom peripheral wall portion is longer, in the extending direction of the gas-flowing paths, than a length of the first grooves.

19. The power supply device according to claim 18, wherein:
each of the separators has an upper peripheral wall portion that is formed at an upper end of the interposed plate portion and protrudes in a stacking direction of the battery cells; and
the interposed plate portion includes an uppermost one of the recessed parts that is positioned closest to the upper peripheral wall portion; and
the interposed plate portion includes at least a second groove formed between the uppermost recessed part and the upper peripheral wall portion, and
a depth of the second groove is smaller in the stacking direction of the battery cells than a depth of each of the recessed parts.

* * * * *